United States Patent [19]
Lantto et al.

[11] Patent Number: 5,621,783
[45] Date of Patent: Apr. 15, 1997

[54] METHOD AND AN ARRANGEMENT RELATING TO TELECOMMUNICATIONS SYSTEMS

[75] Inventors: Sven J. Lantto, Tullinge; Mats O. Stille, Stockholm; Mats W. Gandils, Älvsjö; Bo A. V. Åström, Tullinge, all of Sweden; Ari Peltonen, Aachen, Germany

[73] Assignee: Telefonaktiebolaget LM Ericsson, Stockholm, Sweden

[21] Appl. No.: 326,947

[22] Filed: Oct. 21, 1994

[30] Foreign Application Priority Data

Oct. 22, 1993 [SE] Sweden .................. 9303491

[51] Int. Cl.⁶ ........................................ H04Q 7/22
[52] U.S. Cl. .................................. 379/59; 455/33.1
[58] Field of Search ........................ 379/58, 59, 60, 379/111, 112, 113, 114, 115, 201, 210, 211, 213, 219, 220, 221, 222; 455/33.1, 33.2, 59.1, 56.1

[56] References Cited

U.S. PATENT DOCUMENTS

| | | |
|---|---|---|
| 2,909,607 | 10/1959 | Nilsson et al. . |
| 4,187,398 | 2/1980 | Stark . |
| 4,723,273 | 2/1988 | Diesel et al. . |
| 4,788,719 | 11/1988 | Gupta . |
| 5,216,703 | 6/1993 | Roy . |
| 5,217,703 | 6/1993 | Goodson . |
| 5,222,125 | 6/1993 | Creswell et al. . |
| 5,400,390 | 3/1995 | Salin .................. 379/59 |

FOREIGN PATENT DOCUMENTS

| | | |
|---|---|---|
| 510411 | 10/1992 | European Pat. Off. . |
| 531048 | 3/1993 | European Pat. Off. . |
| 422135 | 2/1982 | Sweden . |
| 92/22174 | 12/1992 | WIPO . |

OTHER PUBLICATIONS

CME 20, BSC Operation and Maintenance, System Description, pp. 5–48 (1993).
GSM Recommendation 09.02, "GSM 09.02 MAP" (X.219), pp. 47–50, 229–235, 200–262, 477–478 (Nov. 1994).
CCITT Recommendation X.208, pp. 60–71 (1988).
Internode Specification for Digital Mobile Communications Network, Ver. 3.2, pp. 1–18 (Jul. 9, 1992).

Primary Examiner—Curtis Kuntz
Assistant Examiner—Michael B. Chernoff
Attorney, Agent, or Firm—Burns, Doane, Swecker & Mathis, L.L.P.

[57] ABSTRACT

The present invention relates to a method for transferring a position mark (CO-B0) of a mobile subscriber (B0) in a telecommunications system. The telecommunications system includes a first mobile telephone network (PLMN01) which includes a main switching center (GMSC01) to which a home location register (HLR0) is connected. The telecommunications system also includes a second mobile telephone network (PLMN02) which includes at least one first switching center (MSC-B0). The first switching center includes a visitor location register (GLR-B0) in which the position mark (CO-B0) of the mobile subscriber (B0) is stored. The second mobile telephone network (PLMN02) also includes a main visitor location register (GLR02) which is cognizant of the visitor location register (GLR-B0) of the second mobile telephone network (PLMN02) in which the visiting mobile subscriber (B0) is registered temporarily. The mobile subscriber (B0) has requested for calls to be transferred to an end-subscriber (C0) and a calling subscriber (A0) has called the mobile subscriber (B0). The inventive method comprises the steps of collecting the position mark (CO-B0) of the called mobile subscriber (B0) from the visitor location register (GLR-B0) by transferring the position mark to the home location register (HLR0), via the main visitor location register (GLR02); and forwarding the position mark (CO-B0) of the called mobile subscriber (B0) from the home location register (HLR0) to the main switching center (GMSC01).

56 Claims, 10 Drawing Sheets

METHOD AND AN ARRANGEMENT RELATING TO TELECOMMUNICATIONS SYSTEMS

TECHNICAL FIELD

The present invention relates to a method and to an arrangement for moving a position coordinate which shows the position of a first mobile subscriber after transferring a call from the first mobile subscriber to a second subscriber, so that the position coordinate can thereafter be brought together with a positionmark which indicates the position of the second subscriber. The cost of the call can be billed after combining the position coordinates, for instance.

DESCRIPTION OF THE PRIOR ART

It has long been known to use certain so-called plus services within public telephone networks, for instance call transfer service. When debiting a call which has been transferred in a country network, the cost of the call is shared fairly between the subscribers involved. A calling subscriber pays the call costs to a called subscriber, whereas the called subscriber pays the remainder of the cost to the end-subscriber to which the call has been transferred. This type of billing within the public switched network is possible because each of the subscribers involved is fixedly located at known geographical points. The distance between the subscribers is calculated on the basis of the subscribers' telephone numbers. U.S. Pat. No. 5,217,703 teaches a method of dividing the cost of a call by virtue of a mobile subscriber calling a public special node with the aid of a prefix which precedes the telephone number of the called subscriber, wherein the calling subscriber need only pay the cost of the call to the node. Many mobile telephone systems, among them the Japanese PDC system, which has already passed the first development phase, now concentrate on further developing these systems, including the introduction of optional services. One such service that exists today is the call transfer service. In the case of present-day techniques, when a calling subscriber calls a subscriber which is located in a mobile telephone network and which has asked for calls to be transferred to a so-called end-subscriber, the calling subscriber is billed for the call for the whole distance between the calling subscriber and the end-subscriber. A division of the cost in the same way as that employed in the fixed telephone network is desirable. The mobility of the mobile units in the mobile telephone system make the transfer of the prior art technology to the mobile telephone system problematic. Because of the mobility of the mobiles, the subscriber telephone number cannot be used as a basis for billing. In Japan, the country is divided geographically into so-called messages areas of about 2×2 km in size, the centrepoints of these areas being called position coordinates. The message area is, in actual fact, represented by a number which is specific to the message area and by means of which the geographical location of the message area can be calculated. This number has been made equivalent to the position coordinate in the following text, in order to enable the invention to be understood more readily. The message areas are used both by public switched networks and by mobile telephone networks to establish whether a call between two subscribers shall be debited at a so-called high or low rate, depending on whether the call is made over a distance greater than or smaller than 160 km. The distance is assessed by virtue of the fact that when making a call, the position coordinate of a calling subscriber accompanies the call number of a called subscriber and is combined or brought together with the position coordinate of the called subscriber. The position coordinates can then be compared to establish the distance between the subscribers. The aforesaid technique cannot be applied in the case of a call between a calling subscriber and a called subscriber who has requested a call transfer to an end-subscriber and when there is no connection route either between the calling subscriber and the called subscriber or between the called subscriber and the end-subscriber, but solely between the calling subscriber and the end-subscriber. It is necessary to transfer a position coordinate before connecting the call. Mobile systems which include the call transfer service are the GSM System (Global System for Mobile Communication) and the PDC System (Personal Digital Cellular). The GSM system is described in CME-20 SYSTEM, ERICSSON document EN/LAT 120 226 R2A 1991. The network part in PDC is described in the standard Internode Specification for Digital Mobile Communications Network, Ver. 3.2.

SUMMARY OF THE INVENTION

The object of the present invention is to transfer a positionmark in a mobile telephone system, so as to be able to combine the position mark, which indicates the geographical position of a first mobile, with a position mark which indicates the geographical position of a second subscriber, this combining of the position marks being a further object of the invention. The two position marks can be compared after having been brought together. This comparison of the position marks is necessary in order to enable the cost of a call to be shared fairly when a called subscriber has asked for calls to be transferred to an end-subscriber. This facility for facilitating cost-sharing is another object of the invention. A calling subscriber pays for the call up to the location of the called subscriber, while the called subscriber pays for the call between its own location and the location of the end-subscriber. This facility of enabling call costs to be determined more easily is a further object of the invention. After having compared the position marks, the call can be billed, for instance, or connection of the call may be denied because the distance is considered too far. The facility which facilitates the choice as to whether or not the call shall be connected is a further object of the invention. According to known mobile telephony techniques, identity designations are stored for the purpose of localizing mobile subscribers in a central database, the so-called home location register HLR in the mobile telephone system. The term localize signifies that it is possible to establish the local exchange in which the subscribers are dealt with at that moment in time. This is possible because the home location register is able to establish a connection with all local databases in the system belonging to the local exchanges or local switching centres, these local databases being referred to as visitor location registers. The position marks of the mobile units are also stored in the visitor location registers, i.e. information relating to the geographical area in the active range of the local switching centre in which the mobile is located at that particular time. The aforesaid problem of transferring a positionmark is solved by the home location register taking from the visitor location register of the called subscriber the position mark that shows the geographical position of the called subscriber, before transferring the call. This position mark is combined with the positionmark of the end-subscriber in a later stage. The two position marks can be compared after completion of the transfer, and the call can then be billed.

The invention will now be described in more detail with reference to preferred exemplifying embodiments thereof and also with reference to the accompanying drawings. The invention is characterized by the characteristic features set forth in the following Claims.

BRIEF DESCRIPTION OF THE DRAWINGS

FIG. 1b is a flow sheet which illustrates diagrammatically an inventive method for transferring a position mark in the traffic situation illustrated in FIG. 1a.

FIG. 2b is a flow sheet illustrates diagrammatically an inventive method for transferring a positionmark in the traffic situation shown in FIG. 2a.

FIG. 3b is a flow sheet which illustrates diagrammatically an inventive method for transferring a position mark in the traffic situation shown in FIG. 3a.

FIG. 4b is a flow sheet which illustrates diagrammatically an inventive method for transferring a position mark in the traffic situation shown in FIG. 4a.

BEST MODES OF CARRYING OUT THE INVENTION

A mobile telephone network of the PDC type (Personal Digital Cellular) will now be described in general, whereafter a number of exemplifying embodiments of the invention will be described with reference to the accompanying drawings.

A PDC-type mobile telephone network includes a central mobile telephone switching centre, a so-called main switch, which is connected to several local telephone switching centres, so-called local switches. Each local switch is connected to a number of base stations each supervising a geographical area, called a cell. Each of the local switches includes a local database referred to as a visitor location register. The visitor register contains all mobile units which are located at that particular time in one of the cells handled by the local switch. The mobile telephone network also includes a first central database, a so-called home location register, which is connected to both the main switch and to all visitor registers within the network. The mobile units which subscribe to the mobile telephone network operator are registered in the home register. The network also includes a second central database, a so-called main visitor location register which is also connected to all visitor registers within the network. Those mobile units which are temporarily located in the network but which belong to another mobile telephone network, i.e. which subscribe to another mobile telephone network operator, are registered in the main visitor register. The primary purpose of the main visitor register is to cut down signalling between the visitor register of the local network and the home register of another network. In addition to being divided into cells, the total geographical area covered by the mobile telephone system is also divided into so-called message areas, normally rectangular areas. The position of the message areas within the total geographical area covered by the public switched network is given by a position coordinate which indicates the centre point of the message area. The area covered by a message area can vary. Information as to the location of a mobile unit in a message area is stored in the visitor register which belongs to the local switch and which handles the mobile at that moment in time, i.e. the position coordinate is stored in the visitor register. The PDC network is well specified in the standard Internode Specification for Digital Mobile Communications Network, Ver. 3.2.

Figure 1A:
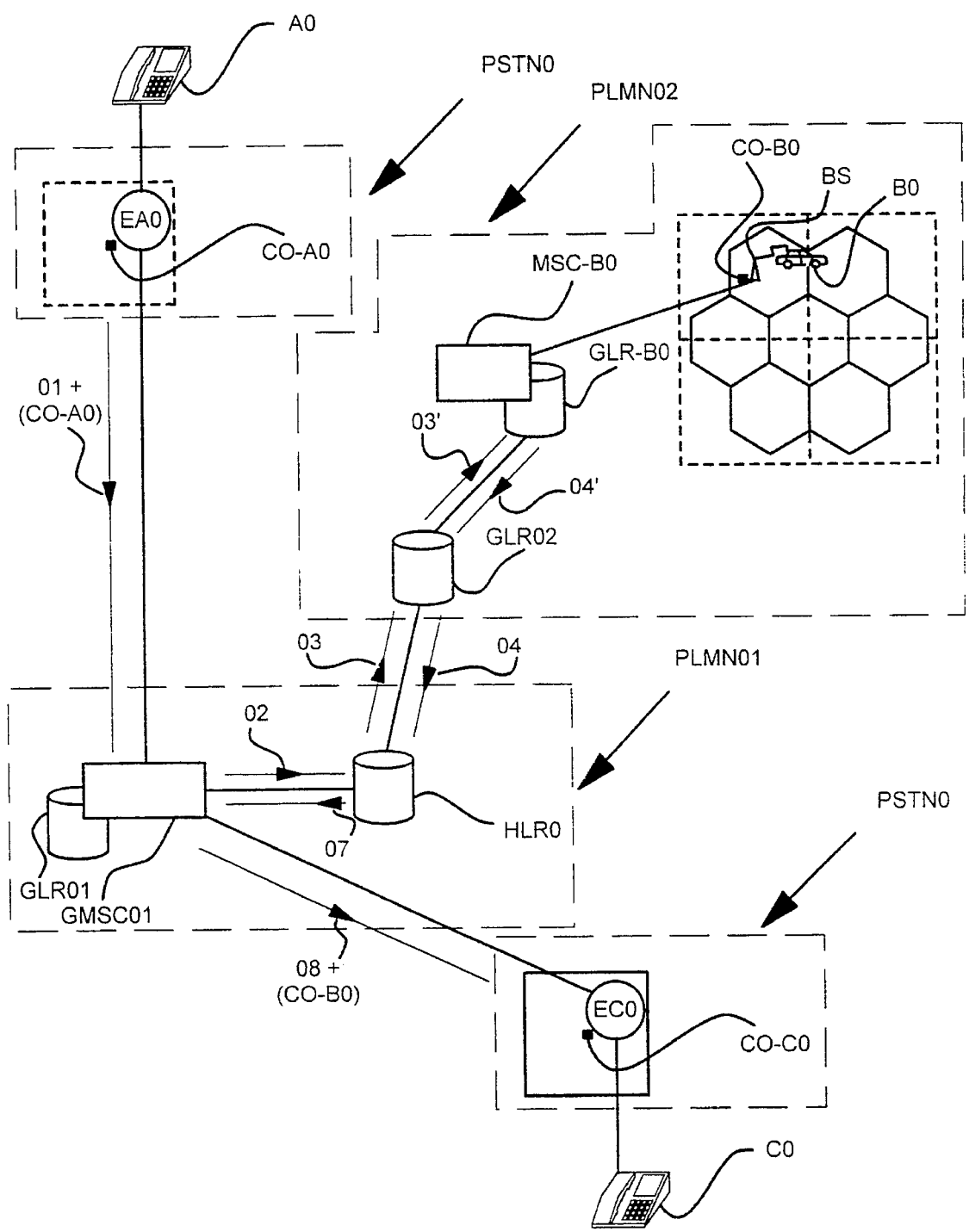
FIG. 1a is a block schematic which illustrates a traffic situation in a telephone network, where a fixed calling subscriber calls, through a main switching centre, a mobile subscriber who has requested calls to be transferred to a fixed end-subscriber. The called subscriber is located temporarily in a mobile telephone network other than its home network.

FIG. 1a illustrates only those local switches, visitor registers, message areas and base stations that are necessary in order to obtain an understanding of the invention. Multiples of these units have been excluded from the Figure, for the sake of clarification. A mobile unit B0, the so-called subscriber B0, belongs to a first mobile telephone network PLMN01, i.e. the subscriber B0 subscribes to the mobile telephone network PLMN01 and is therewith permanently registered in a home location register HLR0. The home register HLR0 is constantly updated with regard to the visitor register in which the called subscriber is at that moment registered within the local network, or in which mobile telephone network the subscriber is located when the subscriber is located in a network other than its local network. The called subscriber B0 is located in a second mobile telephone network PLMN02, more precisely within a cell which is controlled by a local switch MSC-B0. Thus, the called subscriber B0 is simultaneously registered temporarily in a first visitor register GLR-B0 and in a main visitor register GLR02 and is stationarily registered in the local home register HLR0. The main visitor register GLR02 is always kept updated in relation to the visitor register GLR-B0 in which the visiting mobile unit B0 is registered at that moment in time. The cell is located within the area covered by a message area, and the position coordinate CO-B0 of this message area, i.e. its centrepoint, is stored in the first visitor register GLR-B0.

FIG. 1a also shows those parts of a public switched telephone network PSTN0 necessary to the illustrated embodiment of the invention. The public telephone network PSTN0 has been symbolized in the Figure by two mutually separated punctiform rectangles. A calling subscriber A0 and an end-subscriber C0 are fixedly connected to a respective public switching centre, the so-called first and second standard switches of exchanges EA0, EC0 in the public switched telephone network. The geographical position of the first public exchange EA0 is given by a position coordinate CO-A0 which is stored in the public switching centre. The geographical position of the second public standard exchange or switching centre EC0 is given by a position coordinate CO-C0 stored in the public switching centre. The public switches or exchanges EA0, EC0 are connected to the main switch GMSC01 in the first mobile telephone network PLMN01. Signalling between the public network PSTN0 and the first mobile telephone network PLMN01 is effected over its connection.

All fixed connections between earlier enumerated signalling nodes, in other words subscribers, switches, registers and base stations, have been illustrated in FIG. 1a in thick full lines. Signalling, which will be described in detail below, takes place, of course, over the fixed connections, although signalling has been shown in the form of thin full lines on one side of the thick lines, for the sake of clarity. The arrows drawn in conjunction with the signalling lines show the directions in which signalling occurs. The called subscriber B0 communicates with the base station BS over a radio link. The radio link has been shown in the Figure as a zig-zag between base station and mobile subscriber. The signalling shown in the Figure and necessary to the present invention does not claim to be the total signalling procedure that is carried out when connecting a call. The Figure shows only the signalling that takes place in the three networks PSTN0, PLMN01 and PLMN02, whereas signalling to and from the subscribers involved has been excluded from the Figure. Furthermore, neither the text nor the Figure include details of that part of the signalling procedure which is considered to form part of the known prior art.

As earlier mentioned, the mobile telephone systems PLMN01, PLMN02 operate in accordance with PDC specifications, although the method described below may also be applied in similar systems. The exemplifying embodiment described in detail below shows the call billing procedure adopted when the calling subscriber A0 calls the called subscriber B0 after the called subscriber B0 has asked for calls to be transferred to the end-subscriber C0. As earlier mentioned, when billing a call after a call transfer has been made in a mobile telephone system, it is important to be able to localize the geographical positions of the subscribers involved and to bring these positions together for comparison therebetween and for calculation of the distance involved. The inventive method which will now be presented is able to perform this essential function and icludes the following steps:

The calling subscriber A0 calls the called subscriber B0.

A first address message 01 which includes the call number of the called subscriber B0 is sent together with the position coordinate CO-A0 of the calling subscriber from the first country switch EA0 to the main switch GMSC01.

The position coordinate CO-A0 of the calling subscriber is stored in the main switch GMSC01.

A routing query 02 requesting the location of the called subscriber B0, i.e. asking for the local switch that handles the called subscriber B0, is sent from the main switch GMSC01 to the home register HLR0. As before mentioned, the home register is aware of which mobile telephone network PLMN02 the called subscriber is located when this network is not the local network PLMN01.

Using information earlier obtained, the home location register HLR0 ascertains that the called subscriber B0 has asked for calls to be transferred to the end-subscriber C0 and that the called subscriber is temporarily located in a second mobile telephone network PLMN02 which is handled by an operator other than the local operator, wherein the inventive method further includes the following steps:

There is made a coordinate query 03 asking for the position coordinate CO-B0 of the called subscriber B0 to be sent from the home register HLR0 to a main visitor register GLR02 in the second mobile telephone network PLMN02. The main visitor register GLR02 is cognizant of the visitor register GLR-B0 in the second network PLMN02 in which the called subscriber B0 is registered at that moment in time.

With the aid of two messages 03', 04', the position coordinate of the called subscriber is taken from the visitor register GLR-B0 in which the called subscriber is temporarily registered and transferred to the main visitor register GLR02. The two messages 03' and 04' are of the same type as the earlier mentioned messages coordinate-query 03 and the coordinate-response 04 mentioned below. The only difference lies in the address part which indicates destination.

A coordinate response 04 containing the position coordinate CO-B0 of the called subscriber B0 is sent from the main visitor register GLR02 to the home register HLR0.

A routing response 07 in answer to the aforementioned routing query 02 and containing the call number of the end-subscriber C0 is sent from the home register HLR0 to the main switch GMSC01, together with the position coordinate CO-B0 of the other subscriber.

The position coordinate CO-B0 of the called subscriber B0 is stored in the main switch GMSC01.

The distance between the position coordinate CO-A0 of the calling subscriber and the position coordinate CO-B0 of the called subscriber is assessed in the main switch GMSC01, wherein a preliminary decision is taken to connect the call. This preliminary decision will be explained in more detail below.

Preparation is made to connect the call between the calling subscriber A0 and the end-subscriber C0. An address message 08 containing the call number of the end-subscriber C0 is sent together with the position coordinate CO-B0 of the called subscriber B0 from the main switch GMSC01 to the second public exchange or switch EC0.

The position coordinate CO-B0 of the called subscriber B0 is stored in the second public exchange EC0.

The distance between the position coordinate CO-B0 of the called subscriber and the position coordinate CO-C0 of the end-subscriber is assessed in the second public exchange or switch EC0, wherein a final decision is taken to connect the call. This final decision will be explained in more detail below.

The end-subscriber C0 answers the call from the calling subscriber A0, by lifting his telephone receiver, wherewith the call is considered to have been connected.

The cost, i.e. a so-called primary call cost, covering the call between the calling subscriber A0 and the called subscriber B0 is calculated in the main switch GMSC01, wherein the calling subscriber A0 is billed for the call.

The cost covering the call between the called subscriber B0 and the end-subscriber C0, a so-called secondary call cost, is assessed in the second public exchange EC0 and the called subscriber B0 is billed for the cost.

It has been assumed in the above embodiment that the calling subscriber A0 has specified a distance condition relating to the maximum distance which can be permitted between the calling subscriber A0 and the called subscriber B0 for the call to be connected. The preliminary decision as to whether or not the call shall be connected is made after assessing the distance between the two subscribers.

In the embodiment, it has also been assumed that the called subscriber B0 has specified a distance condition relating to the maximum distance which can be between the called subscriber B0 and the end-subscriber C0 for a call to be connected. The final decision as to whether or not a call shall be connected, which is made only after the preliminary decision has been reached, is made after assessing the distance between the called subscriber B0 and the end-subscriber C0. The call is not connected until both the preliminary and the final decision have been taken to connect the call.

Naturally, a case of this type is conceivable in which the distance between the calling subscriber A0 and the called subscriber B0 is longer than the maximum permitted distance specified between the subscribers. In this case, connection of the call is denied through a spoken message to the calling subscriber A0, in which it is suggested that the subscriber A0 should accept a longer distance than the distance earlier specified. When the called subscriber B0 has specified a maximum permitted distance condition between himself and the end-subscriber C0, it is feasible to precede denial of the call connection with a message to the calling subscriber A0 suggesting that the caller calls the direct number of the end-subscriber.

The aforedescribed signalling procedure will be seen as an example of how signalling is effected when practicing the inventive method. As will be understood, the order in which the aforesaid method steps are carried out can vary. For instance, the distance between the calling subscriber A0 and the called subscriber B0 can be assessed and the cost of the call calculated at different stages than in the procedure than those stated above. It is continuously also conceivable for a main visitor register GLR02 to obtain knowledge relating to the position coordinate of the message area in which the subscriber is located, in addition to having knowledge of the visitor register in which a visiting mobile subscriber is registered, wherein it is only necessary to signal between the home register and the main visitor register.

Figure 1B:
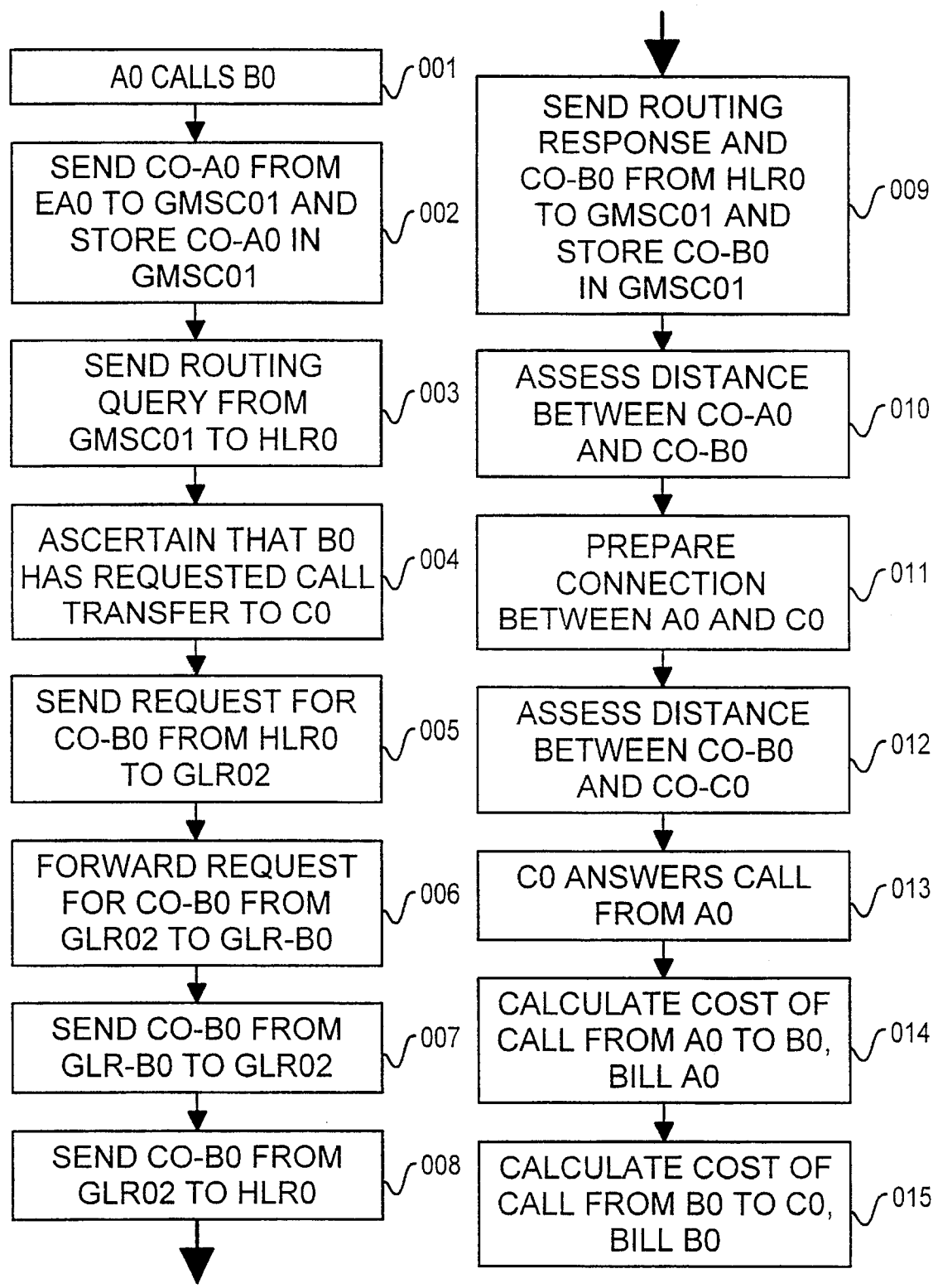

FIG. 1b is a flow sheet which illustrates the aforedescribed method. The flow sheet and the following simplified description of the method are intended to be read together with FIG. 1a and the descriptive text associated with this Figure. The flow sheet illustrates the steps that are most essential to the concept on which the invention is based. The abbreviations included in the text in the Figure are considered to have been clearly explained in the aforegoing. The method is carried out in accordance with the following description and in accordance with FIG. 1b:

The calling subscriber A0 calls the called subscriber B0, in accordance with block 001.

An address message to the called subscriber B0 is sent from the first public exchange or switch EA0 to the main switch GMSCO1 together with the position coordinate CO-A0 of the calling subscriber A0. The position coordinate CO-A0 of the calling subscriber is stored in the main switching centre GMSCO1, in accordance with block 002.

A routing query containing a request for a route to the called subscriber B0 is sent from the main switch GMSC01 to the home register HLR0 in accordance with known technology and in accordance with block 003.

The home register HLR0 ascertains that the called subscriber B0 has requested call transfer to the end-subscriber C0 and that the called subscriber is located in another network PLMN02, in accordance with block 004.

An enquiry with a request for the position coordinate CO-B0 of the called subscriber B0 is sent from the home register HLR0 to the main visitor register GLR02, in accordance with block 005.

The request for the position coordinate CO-B0 of the called subscriber B0 is forwarded from the main visitor register GLR02 to the visitor register GLR-B0 of the called subscriber, in accordance with block 006.

The position coordinate CO-B0 of the called subscriber B0 is sent from the visitor register GLR-B0 of the subscriber B0 to the main visitor register GLR02, in accordance with block 007.

The position coordinate CO-B0 of the called subscriber B0 is sent from the main visitor register GLR02 to the home register HLR0, in accordance with block 008.

A routing response to the earlier routing query, containing the call number of the end-subscriber C0, is sent from the home register HLR0 to the main switch GMSC01 together with the position coordinate CO-B0 of the second subscriber, in accordance with block 009. The position coordinate CO-B0 of the called subscriber B0 is then stored in the main switch GMSCO1.

The distance between the position coordinate CO-A0 of the calling subscriber and the position coordinate of the called subscriber is assessed in the main switch GMSC01, in accordance with block 010.

A call connection between the calling subscriber A0 and the end-subscriber C0 is prepared, wherein the position coordinate CO-B0 of the called subscriber B0 is sent from the main switch GMSC01 to the second country switch EC0. The position coordinate CO-B0 of the called subscriber is stored in the second country switch EC0, in accordance with block 011.

The distance between the position coordinate CO-B0 of the called subscriber B0 and the position coordinates CO-C0 of the end-subscriber C0 is assessed in the public exchange or switch EC0, in accordance with block 012.

The end-subscriber C0 answers the call from the calling subscriber A0, by lifting his telephone receiver, in accordance with block 013.

The cost of the call between the calling subscriber A0 and the called subscriber B0 is calculated, wherein the calling subscriber A0 is billed the cost, in accordance with block 014.

The cost of the call between the called subscriber B0 and the end-subscriber C0 is calculated and the called subscriber B0 is billed for the cost of this part of the call, in accordance with block 015.

The aforedescribed method is only an example of one configuration of the ordered sequence in which the various method steps can be carried out. For instance, it is feasible to calculate the cost of the call in a later stage.

The aforementioned coordinate query 03, 03' contained in the messages and the coordinate response 04', 04 will now be described in brief. The home register HLR0 and the main visitor register GLR02 are both able to communicate with earlier unknown interfaces. The protocol has a structure similar to the protocol used in a GSM mobile telephone network, namely "GSM 09.02MAP", i.e. the protocol described in GSM recommendation 09.02. Consequently, the protocol can be structured by using a CCITT No. 7 based protocol MAP, SCCP and TCAP from the protocol stack of CCITT No. 7. CCITT No. 7 is well known to the person skilled in this art.

The MAP operation between the home register HLR0 and the main visitor register GLR02 and between the main visitor register GLR02 and the visitor register GLR-B0, i.e. the messages coordinate query 03, 03' and coordinate response 04', 04 can be described according to ASN.1 (CCITT recommendation X.208) as shown below:

GET MSC/GLR DATA

GetMSC/GLRData ::= Operation
PARAMETER
imsi
RESULT
messagearea

The above sequence for bringing the position coordinate CO-B0 of the called subscriber B0 to the home register HLR0 is as follows:

The message coordinate query 03 (GetMSC/GLRData) is sent from the home register HLR0 to the main visitor register GLR02, while stating the identity number (IMSI) of the called mobile subscriber B0.

The message coordinate query 03' (GetMSC/GLRData) is sent from the main visitor register GLR02 to the visitor register GLR-B0 together with the identity number (IMSI) of the called mobile subscriber B0.

A coordinate response 04' including the position coordinate CO-B0 (MessageArea) is sent from the visitor register GLR-B0 to the main visitor register GLR02.

A coordinate response 04 including the position coordinate CO-B0 (MessageArea) is sent from the main visitor register GLR02 to the home register HLR0.

Figure 2A:
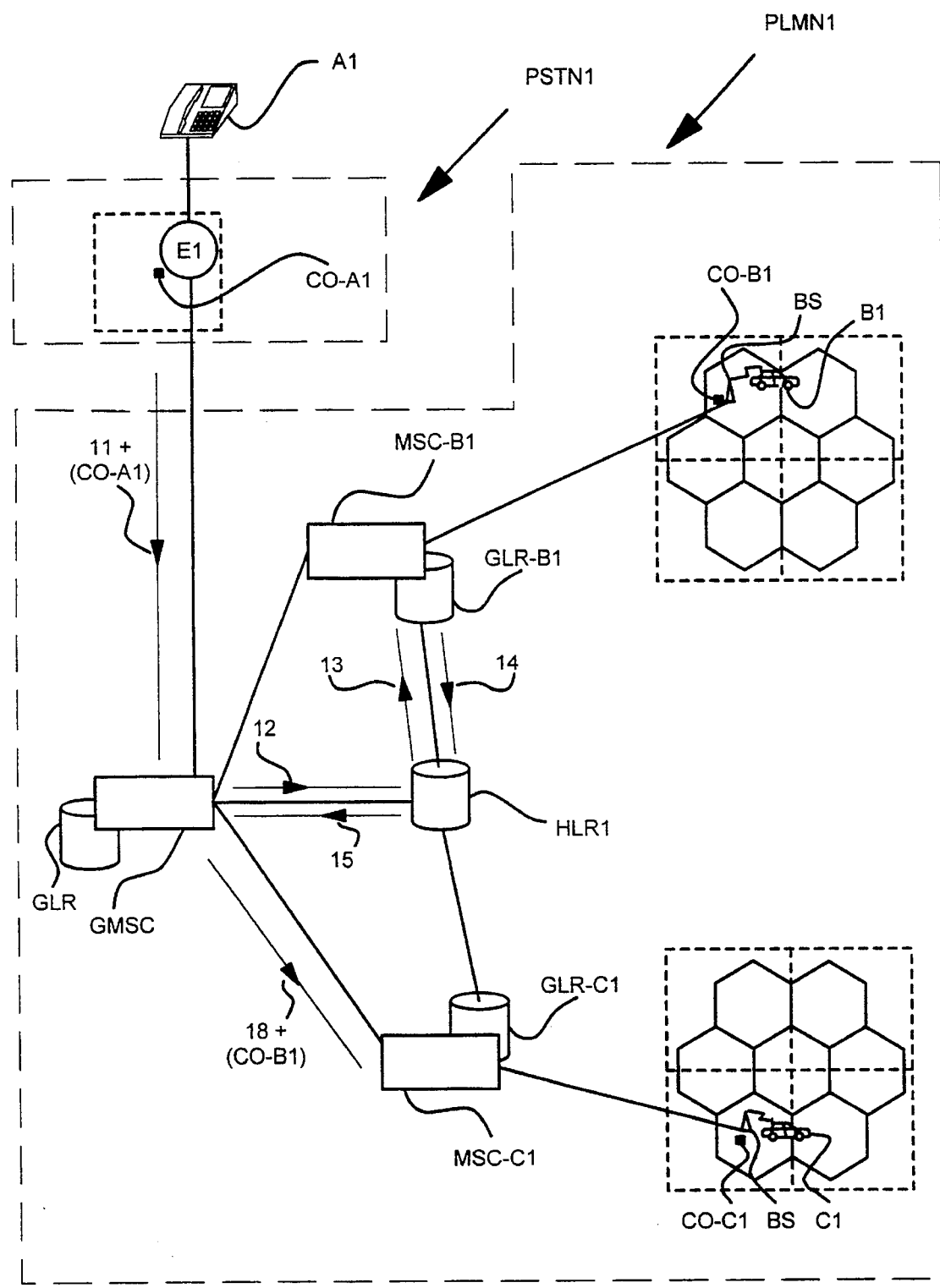
FIG. 2a is a block schematic which illustrates a traffic situation in a telephone network where a fixed calling subscriber calls, through a main switching centre, a mobile subscriber who has requested for calls to be transferred to a mobile end-subscriber.

There now follows a description of a further embodiment of the invention. FIG. 2a illustrates solely the local switches, visitor registers, message areas and base stations that are necessary to understand the invention. Multiples of these units have been excluded from the Figure as in the earlier case, for the sake of simplicity. A mobile unit B1, the called subscriber B1, belongs to a mobile telephone network PLMN1 and is located within a cell controlled by a first local switching centre MSC-B1. The called subscriber B1 is thus registered temporarily in a first visitor register GLR-B1 and permanently registered in a home register HLR1. The home register HLR1 is constantly updated with regard to the visitor register GLR-B1 in which the mobile unit B1 is registered temporarily. The cell is located within the area covered by a message area, and the position coordinate CO-B1 of which message area, i.e. its centre point, is stored in the first visitor register GLR-B1. A mobile unit C1, the end-subscriber C1, which also belongs to the mobile telephone network PLMN1, is located within a cell controlled by a second local switching centre MSC-C1. The end-subscriber C1 is, at the same time, registered temporarily in a second visitor register GLR-C1 and is permanently registered in the home register HLR1. The cell is located within the coverage area of a message area and the position coordinate CO-C1 of the message area is stored in the second visitor location register GLR-C1. FIG. 2a also shows those parts of a public switched telephone network PSTN1 that are necessary in carrying out the illustrated embodiment. A calling subscriber A1 is permanently connected to a first public exchange E1 in the public switched telephone network. The geographical location of the public exchange E1 is disclosed by a position coordinate CO-A1 which is stored in the public exchange. The public exchange E1 is connected to the main switch GMSC in the mobile telephone network PLMN1. Signalling between the public switched network PSTN1 and the mobile telephone network PLMN1 takes place over this connection.

All permanent connections between the earlier enumerated signalling nodes, i.e. subscribers, switches, registers and base stations, have been shown in FIG. 2 with thick full lines, as in earlier Figures. Signalling, which is described in detail below, takes place over the permanent connections, although this signalling has been shown with thin full lines on one side of the permanent connections, for the sake of clarity. The arrows shown on the signalling lines indicate the directions in which signalling takes place. The called subscriber B1 and the end-subscriber C1 communicate with respective base stations BS via a radio link. The radio link has been shown in the Figure by a zig-zag marking between base stations and mobile subscribers. The signalling necessary to the invention and illustrated in the Figure does not claim to be the total signalling that is carried out when connecting a call. Only the signalling in the two networks PSTN1 and PLMN1 is shown in the Figure, while signalling to and from the subscribers involved has been excluded. Neither has that signalling which is considered to belong to the state of the art been described or shown.

As before mentioned, the mobile telephone system PLMN1 functions according to PDC-specifications, although the method now described can also be applied in systems of similar types. The following exemplifying embodiment illustrates the procedure followed when billing a call when the calling subscriber A1 calls the called subscriber B1 after the called subscriber B1 has asked for calls to be transferred to the end-subscriber C1. As earlier mentioned, when call billing after a call transfer service has been requested in a mobile telephone system, it is essential to be able to localize the geographical positions of the subscribers involved and to bring these positions together for comparison with one another and for calculation of the distance therebetween. The following inventive method is able to carry out this important function and includes the following steps:

The calling subscriber A1 calls the subscriber B1.

A first address message 11 which includes the call number of the called subscriber B1 is sent from the public exchange E1 to the main switch GMSC, together with the position coordinate CO-A1 of the calling subscriber.

The position coordinate CO-A1 of the calling subscriber is stored in the main switch GMSC.

A routing query 12 containing a request for the location of the called subscriber B1, i.e. a query as to the identity of the local switch which deals with the called subscriber B1, is sent from the main switch MSC to the home location register HLR1. As before mentioned, the home register is aware of the visitor location register in which the called subscriber is temporarily registered.

With the aid of earlier obtained information, the home location register HLR1 establishes that the called subscriber B1 has asked for calls to be transferred to the end-subscriber C1, wherein the inventive method includes the following further steps:

A coordinate query 13 requesting the position coordinate CO-B1 of the called subscriber B1 is sent from the home location register HLR1, to the first visitor location register GLR-B1, in which the called subscriber B1 is registered temporarily.

A coordinate response 14 including the position coordinate CO-B1 of the called subscriber B1 is sent from the first visitor register GLR-B1 to the home register HLR1.

A routing response 15 in answer to the earlier-mentioned routing query 12 and including a call number to the end-subscriber C1, this number being stored in the home location register HLR1, is sent from the home register HLR1 to the main switching centre GMSC, together with the position coordinate CO-B1 of the second subscriber.

The position coordinate CO-B1 of the called subscriber B1 is stored in the main switching centre GMSC.

The following part of the method belongs to conventional signalling procedure within PDC mobile telephony and is not therefore explained in detail. The purpose of this procedure is to make clear to the main switch GMSC the location of the end-subscriber C1 at that moment in time, so that messages from the main switch can be directed or routed to this destination. This is achieved by virtue of the main switch GMSC communicating with the home location register HLR1 and therewith obtaining routing information relating to the end-subscriber C1. The inventive method thereafter includes the following further steps:

Preparation is made to connect the call between the calling subscriber A1 and the end-subscriber C1. An address message 18 including the call number of the end-subscriber C1 is sent from the main switch GMSC to the second local switching centre MSC-C1, together with the position coordinate CO-B1 of the called subscriber B1.

The position coordinate CO-B1 of the called subscriber B1 is stored in the second local switch MSC-C1.

The position coordinate CO-C1 of the end-subscriber C1 is taken from the second visitor register GLR-C1 to the second local switch MSC-C1.

The position coordinate CO-C1 of the end-subscriber C1 is stored in the second local switch MSC-C1.

The distance between the position coordinate CO-A1 of the calling subscriber A1 and the position coordinate CO-B1 of the called subscriber B1 is assessed in the main switching centre GMSC.

The distance between the position coordinate CO-B1 of the called subscriber B1 and the position coordinate CO-C1 of the end-subscriber C1 is assessed in the second local switch MSC-C1.

The end-subscriber C1 answers the call from the calling subscriber A1, by lifting his telephone receiver, wherewith the call is considered to be connected.

The cost for the call between the calling subscriber A1 and the called subscriber B1 is calculated in the main switching centre GMSC, and the calling subscriber A1 is billed for this cost.

The cost of the call between the called subscriber B1 and the end-subscriber C1 is calculated in the second local switching centre MSC-C1 and the called subscriber B1 is billed for this part of the call.

The aforedescribed signalling procedure will be seen as an example of how signalling may take place when practicing the inventive method. It will be understood that the order in which the method steps are carried out may vary. For instance, the distance between the calling subscriber A1 and the called subscriber B1 and also calculation of the call cost can be done in an earlier stage.

Figure 2B:
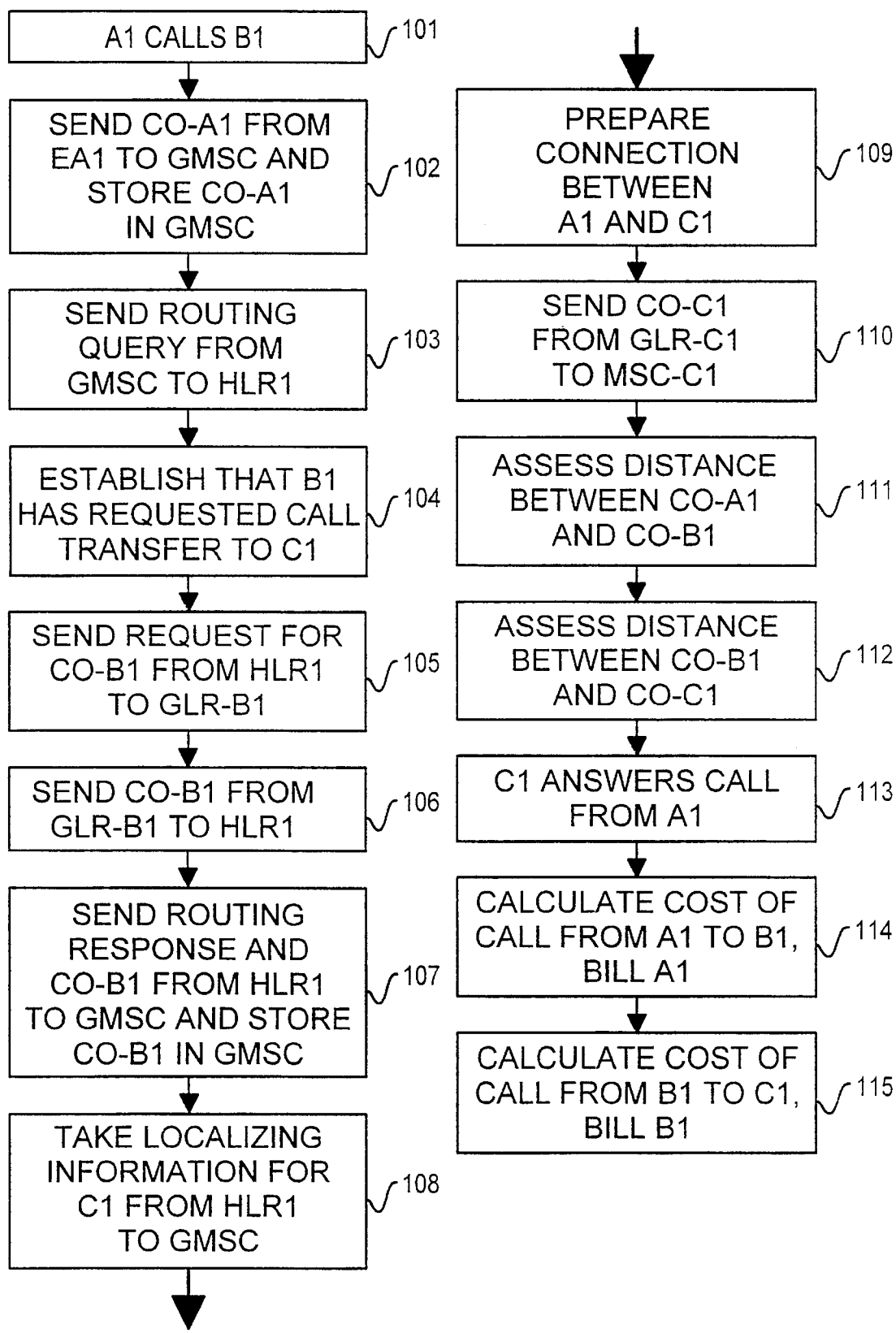

FIG. 2b is a flowsheet illustrating the above-described method. The flowsheet and the following simplified description of the method are intended to be read together with FIG. 2a and with the descriptive text relating to this Figure. The flowsheet illustrates the steps that are most essential to the concept of the invention. The abbreviations used in the text shown in the Figure have been explained in the aforegoing. The method is carried out in accordance with the following description and also in accordance with FIG. 2b:

The calling subscriber A1 calls the called subscriber B1, in accordance with block 101.

An address message to the called subscriber B1 is sent from the public exchange or switch E1 to the main switch GMSC, together with the position coordinate CO-A1 of the calling subscriber A1. The position coordinate CO-A1 of the calling subscriber is stored in the main switch GMSC, in accordance with block 102.

A routing query requesting routing to the called subscriber B1 is sent from the main switch GMSC to the home location register HLR1, in accordance with block 103.

The home register HLR1 establishes that the called subscriber B1 has asked for calls to be transferred to the end-subscriber C1, in accordance with block 104.

A query with a request for the position coordinate CO-B1 of the called subscriber B1 is sent from the home register HLR1 to the first visitor register GLR-B1, in accordance with block 105.

The position coordinate CO-B1 of the called subscriber B1 is sent from the first visitor register GLR-B1 to the home register HLR1, in accordance with block 106.

A routing response in answer to the aforesaid routing query and including the call number to the end-subscriber C1, is sent from the home location register HLR1 to the main switch GMSC together with the position coordinate CO-B1 of the second subscriber, in accordance with block 107. The position coordinate CO-B1 of the called subscriber is then stored in the main switching centre GMSC.

The information necessary to localize the end-subscriber C1 is taken from the home register HLR1 to the main switch GMSC, in accordance with block 108.

Connection of the call between the calling subscriber A1 and the end-subscriber C1 can now be prepared, wherein the position coordinate C0-B1 of the called subscriber B1 is sent from the main switch GMSC to the second local switch MSC-C1. The position coordinate CO-B1 of the called subscriber is stored in the second local switch MSC-C1, in accordance with block 109.

The position coordinate CO-C1 of the end-subscriber C1 is taken from the second visitor register GLR-C1 to the second local switch MSC-C1, in accordance with block 110. The position coordinate CO-C1 of the end-subscriber is stored in the second local switch MSC-C1.

The distance between the position coordinate CO-A1 of the calling subscriber A1 and the position coordinate of the called subscriber B1 is assessed in the main switch GMSC, in accordance with block 111.

The distance between the position coordinate CO-B1 of the called subscriber B1 and the position coordinate CO-C1 of the end-subscriber C1 is assessed in the local switch MSC-C1, in accordance with block 112.

The end-subscriber C1 answers the call from the calling subscriber A1, by lifting his telephone receiver, in accordance with block 113.

The cost of the call between the calling subscriber A1 and the called subscriber B1 is calculated and the calling subscriber A1 is billed for the cost, in accordance with block 114.

The cost of the call between the called subscriber B1 and the end-subscriber C1 is calculated and the called subscriber B1 is billed for this part of the call, in accordance with block 115.

The aforesaid messages coordinate query 13 and coordinate response 14 have the same structure as the messages described with reference to the earlier embodiment. The aforedescribed sequence in which the position coordinate CO-B1 of the called subscriber B1 is transferred to the home location register HLR1 is as follows:

The message coordinate query 13 (GetMSC/GLRData) is sent from the home location register HLR1 to the visitor location register GLR-B1, stating the International Mobile Subscriber Identity (IMSI) of the called mobile subscriber B1.

A coordinate response 14 containing the position coordinate CO-B1 (MessageArea) is sent from the visitor location register GLR-B1 to the home location register HLR1.

There will now be described an embodiment of the invention in which a called subscriber B2 and an end-subscriber C1 are located in a PDC-type mobile telephone network (Personal Digital Cellular) similar to the case in the earlier embodiment. In this embodiment, it is assumed that all local switches MSC also include the earlier described function of the main switch GMSC, i.e. the function whereby a connection can be established between the mobile telephone network and an external telephone network through the medium of a selected local switching centre, and whereby signalling between an external telephone network and the local switching centre need not take place over the main switching centre illustrated in the earlier embodiment. As before mentioned, the PDC network is clearly specified in the standard Internode Specification for Digital Mobile Communications Network, Ver. 3.2.

Figure 3A:
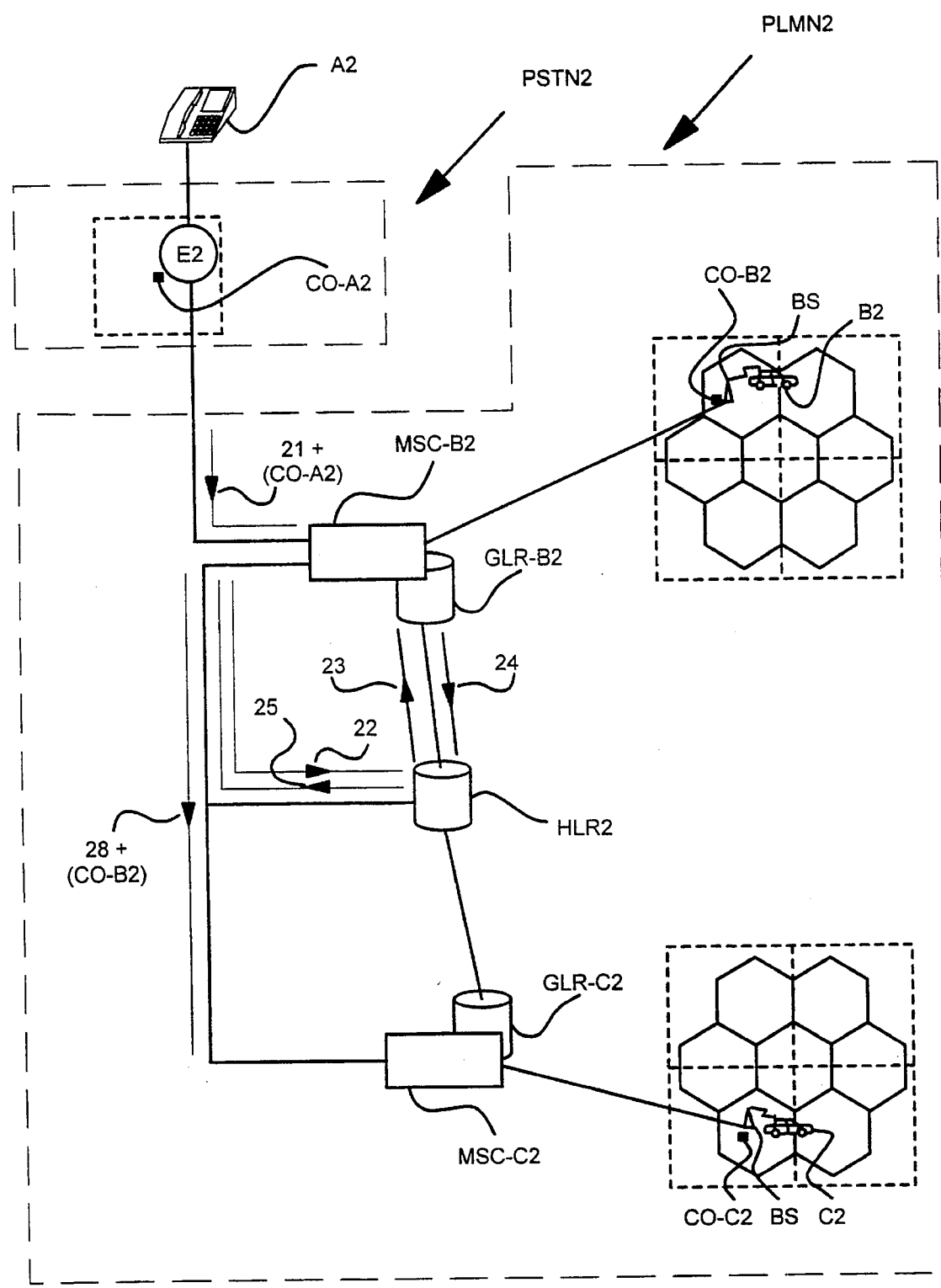
FIG. 3a is a block schematic which illustrates a traffic situation in a telephone network where a fixed calling subscriber calls a mobile subscriber who has requested calls to be transferred to a mobile end-subscriber.

Similar to the earlier Figures, FIG. 3a shows only those local switches, visitor registers, message areas and base stations that are necessary in obtaining an understanding of the invention. The called subscriber B2 and the end-subscriber C2 belong to a mobile telephone network PLMN2 and are handled by the same type of equipment as that described in the earlier embodiment, namely local switches MSC-B2, MSC-C2 and visitor registers GLR-B2, GLR-C2 and a home register HLR2. In the case of this embodiment, the local switches and the visitor registers are referred to as first and second local switches MSC-B2 and MSC-C2 and first and second visitor registers GLR-B2 and GLR-C2 respectively. Each of the mobile subscribers is located within its particular cell, these cells, in turn, being located within a message area whose centre point is given by a position coordinate CO-B2, CO-C2. The mutual relationship between the home register HLR2 and the visitor registers GLR-B2 and GLR-C2 is the same as that earlier described. FIG. 2a also shows those parts of a public switched telephone network PSTN2 necessary to the illustrated embodiment. A calling subscriber A2 is permanently connected to a standard public exchange E2 in the public telephone network. Since all local switching centres or switches MSC-B2 and MSC-C2 in this embodiment also function as main switching centres or switches, a connection is established between the standard exchange E2 of the calling subscriber A2 and the first local switch MSC-B2 which handles the called subscriber B when a call is made from the standard public telephone network PSTN to the mobile telephone network PLMN2. Compare the previous embodiment in which this takes place over the main switching centre GMSC. The reason why the standard public exchange chose the local switching centre that handles the called subscriber as being the most favourable switch for establishing a single connection was because the local switch MSC-B2 happens to lie nearest the standard public exchange E2.

Drawing details such as line types for indicating permanent connections and signalling markings have been shown in FIG. 3a in the same manner as that shown in FIG. 1a.

The signalling necessary to the invention shown in the Figure does not claim to be the full signalling procedure that is carried out when connecting a call. The Figure solely shows the signalling that is carried out in the two networks PSTN2 and PLMN2 while signalling to and from the subscribers involved has been excluded from the Figure. Neither the text nor the details shown in the Figure include signalling that is considered to belong to the state of the art.

The embodiment described below is concerned with the procedure adopted in billing a call when the calling subscriber A2 calls the called subscriber B2 after the called subscriber B2 has asked for calls to be transferred to the end-subscriber C2. As before mentioned, it is essential when billing calls after a call transfer service has been requested in a mobile telephone system to be able to localize the geographical position of the subscribers involved and to bring the positions together for comparison with one another and for calculation of the distance involved. The inventive method described below is able to perform this important function and comprises the following steps:

The calling subscriber A2 calls the called subscriber B2.

A first address message 21 which includes the called number of the called subscriber B2 is sent from the standard public exchange E2 to the first local switching centre MSC-B2, together with the position coordinate CO-A2 of the calling subscriber. It should be pointed out that the choice of just this local switching centre MSC-B2 is taken without knowing whether the called subscriber B2 is handled by just this switch or not.

The position coordinate CO-A2 of the calling subscriber is stored in the first local switch MSC-B2.

A routing query 22 with a request for the location of the called subscriber B2, i.e. asking which local switch handles the called subscriber B2, is sent from the first local switch MSC-B2 to the home location register HLR2. As before mentioned, the home register is cognizant of the visitor register in which the called subscriber is registered at that moment in time.

With the aid of earlier obtained information, the home register HLR2 establishes that the called subscriber B2 has asked for calls to be transferred to the end-subscriber C2, wherein the inventive method includes the following further steps:

A coordinate query 23 with a request for the position coordinate CO-B2 of the called subscriber B2 is sent from the home register HLR2 to the first visitor register GLR-B2 in which the called subscriber B2 is registered at that time.

A coordinate response 24 which includes the position coordinate CO-B2 of the called subscriber B2 is sent from the first visitor register GLR-B2 to the home register HLR2.

A routing response 25 to the aforesaid routing query 22 which includes the subscriber number of the end-subscriber is sent from the home register HLR2 to the first local switch MSC-B2, together with the position coordinate CO-B2 of the second subscriber.

The position coordinate CO-B2 of the called subscriber B2 is stored in the first local switch MSC-B2.

The distance between the position coordinate CO-A2 of the calling subscriber and the position coordinate CO-B2 of the called subscriber is assessed in the first local switch MSC-B2.

The next part of the method belongs to conventional signalling procedure within PDC mobile telephony and will not therefore be explained in detail. The purpose of the method is to make clear to the first local switch MSC-B2 the whereabouts of the end-subscriber C2 at that moment in time, so that messages from the local switch can be routed to this destination. This is achieved by virtue of the first local switch MSC-C2 communicating with the home register HLR2 and therewith obtaining routing information relating to the end-subscriber C2. The inventive method then includes the following further steps:

A call connection between the calling subscriber A2 and the end-subscriber C2 is prepared. An address message 28 which includes the call number of the end-subscriber C2 is sent from the first local switch MSC-B2 to the second local switch MSC-C2, together with the position coordinate CO-B2 of the called subscriber B2.

The position coordinate CO-B2 of the called subscriber B2 is stored in the second local switch MSC-C2.

The position coordinate CO-C2 of the end-subscriber C2 is taken from the second visitor register GLR-C2 and transferred to the second local switch MSC-C2.

The position coordinate C0-C2 of the end-subscriber C2 is stored in the second local switch MSC-C2.

The distance between the position coordinate CO-B2 of the called subscriber and the position coordinate CO-C2 of the end-subscriber is assessed in the second local switch MSC-C2.

The end-subscriber C2 answers the call from the calling subscriber A2 by lifting his telephone receiver, wherewith the call is considered to be connected.

The cost of the call between the calling subscriber A2 and the called subscriber B2 is calculated in the first local switch MSC-B2, and the calling subscriber A2 is billed for this part of the call.

The cost of the call between the called subscriber B2 and the end-subscriber C2 is calculated in the second local switch MSC-C2 and the called subscriber B2 is billed for this part of the call.

The aforedescribed signalling procedure will be seen solely as an example of how signalling can be effected when practicing the inventive method. It will be understood that the order in which the various steps are carried out may vary, as before mentioned.

Figure 3B:
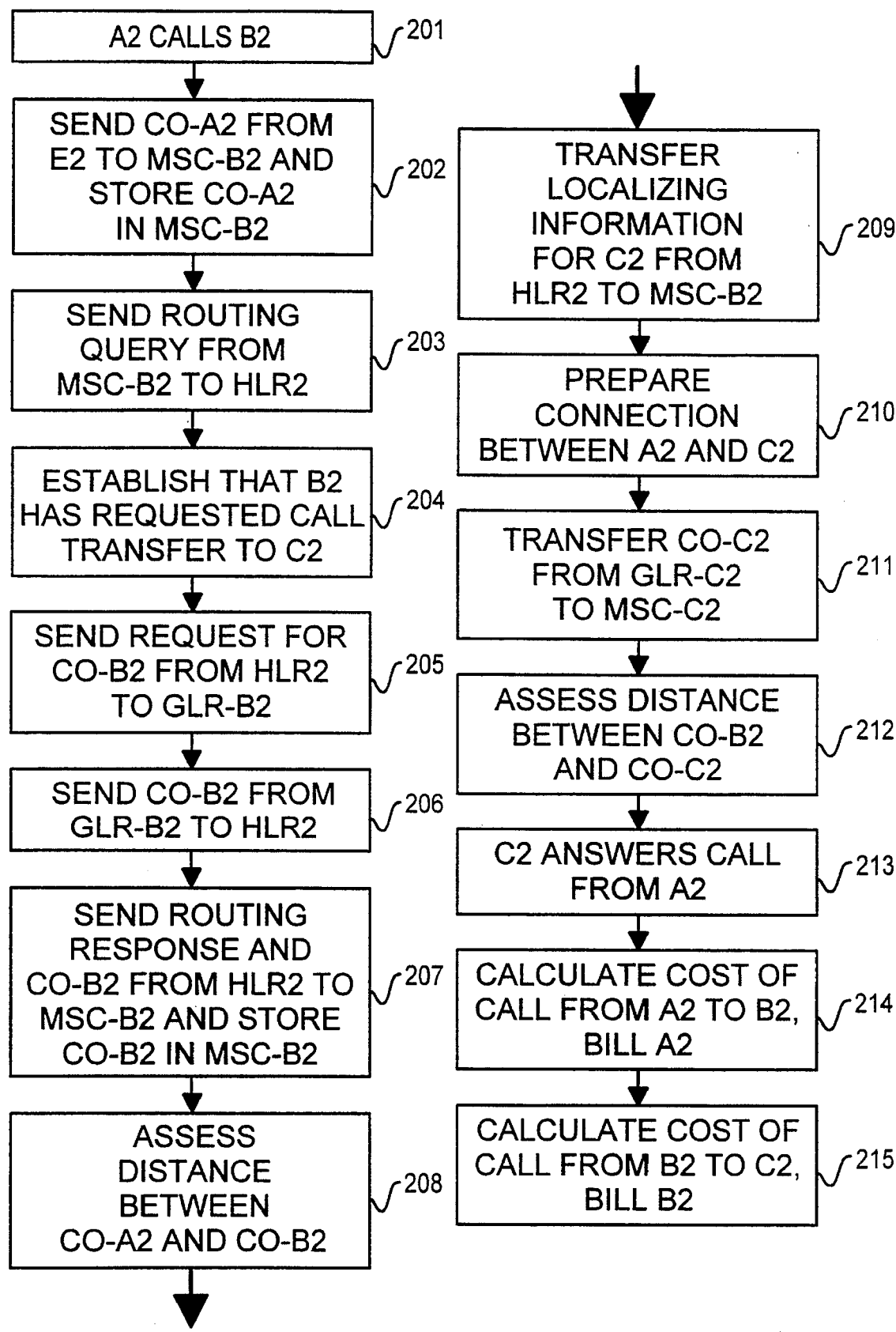

FIG. 3b is a flow sheet which illustrates the aforedescribed method. The flow sheet and the following simplified description of the method are intended to be read together with FIG. 3a and with the descriptive text relating to this Figure. The flow sheet illustrates the steps most essential to the inventive concept. The abbreviations used in the text in the Figure have earlier been explained. The method is effected in accordance with the following description and in accordance with FIG. 3b:

The calling subscriber A2 calls the called subscriber B2, in accordance with block 201.

An address message to the called subscriber B2 is sent from the standard exchange E2 to the first local switch MSC-B2, together with the position coordinate CO-A2 of the calling subscriber A2. The position coordinate CO-A1 of the calling subscriber is stored in the first local switch MSC-B2, in accordance with block 202.

A routing query requesting a route to the called subscriber B2 is sent in accordance with known technology from the first local switch MSC-B2 to the home register HLR2, in accordance with block 203.

The home register HLR2 establishes that the called subscriber B2 has asked for calls to be transferred to the end-subscriber C2, in accordance with block 204.

A query asking for the position coordinate CO-B2 of the called subscriber B2 is sent from the home register HLR2 to the first visitor register GLR-B2, in accordance with block 205.

The position coordinate CO-B2 of the called subscriber B2 is sent from the first visitor register GLR-B2 to the home register HLR2, in accordance with block 206.

A routing response in answer to the earlier routing query and containing the call number to the end-subscriber C2 is sent from the home register HLR2 to the first local switch MSC-B2 together with the position coordinate CO-B2 of the called subscriber, in accordance with block 207. The position coordinate CO-B2 of the called subscriber B2 is then stored in the first local switch MSC-B2.

The distance between the position coordinate CO-A2 of the calling subscriber A2 and the position coordinate of the called subscriber B2 is then assessed in the first local switch MSC-B2, in accordance with block 208.

Information necessary to localize the end-subscriber C2 is taken from the home register HLR2 and transferred to the first local switch MSC-B2, in accordance with block 209.

A call connection between the calling subscriber A2 and the end-subscriber C2 is prepared, wherein the position coordinate CO-B2 of the called subscriber B is sent from the first switch MSC-B2 to the second local switch MSC-C2. The position coordinate CO-B2 of the called subscriber is stored in the second local switch MSC-C1, in accordance with block 210.

The position coordinate C0-C2 of the end-subscriber C2 is taken from the second visitor register GLR-C2 and transferred to the second local switch MSC-C2, in accordance with block 211. The position coordinate C0-C2 of the end-subscriber is stored in the second local switch MSC-C2.

The distance between the position coordinate CO-B2 of the called subscriber B2 and the position coordinate CO-C2 of the end-subscriber C2 is assessed in the local switch MSC-C2, in accordance with block 212.

The end-subscriber C2 answers the call from the calling subscriber A2 by lifting his telephone receiver, in accordance with block 213.

The cost of the call between the calling subscriber A2 and the called subscriber B2 is calculated and the calling subscriber A2 is debited for this part of the call, in accordance with block 214.

The cost of the call between the called subscriber B2 and the end-subscriber C2 is calculated and the called subscriber B2 is debited for the cost of this part of the call, in accordance with block 215.

The messages coordinate query 23 and coordinate response 24 have the same structure as the messages described above in earlier embodiments.

Another embodiment of the invention will now be described in which a calling subscriber A3 and a called subscriber B3 are located in one and the same PDC-type mobile telephone network.

Figure 4A:
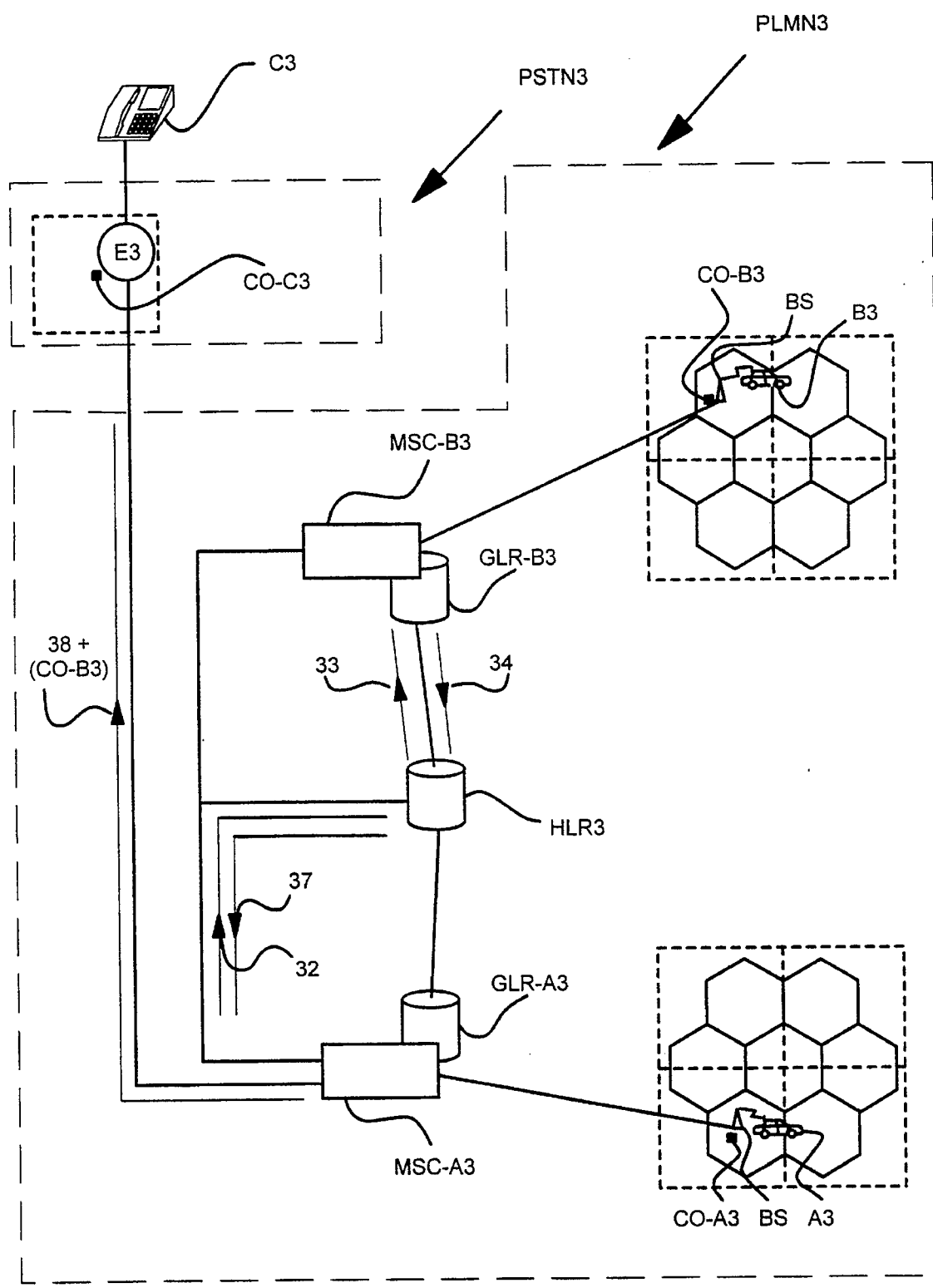
FIG. 4a is a block schematic which illustrates a traffic situation in a telephone network where a mobile calling subscriber calls a mobile subscriber who is located in the same mobile telephone network and where the called subscriber has asked for calls to be transferred to a fixed end-subscriber.

As with the earlier embodiments, FIG. 4a shows only those signalling nodes that are necessary to explain the invention. The calling subscriber A3 and the called subscriber B3 belong to a mobile telephone network PLMN3 and are handled by the same type of equipment as that described in regard of the earlier embodiments, namely local switches MSC-A3, MSC-B3 and visitor registers GLR-A3, GLR-B3 and a home register HLR3. In the case of this embodiment, the local switches and the visitor registers are referred to as first and second local switches MSC-A3 and MSC-B3 and as first and second visitor registers GLR-A3 and GLR-B3 respectively. Each of the mobile subscribers is located within its respective cell, wherein each of the cells is located in turn within a message area whose centrepoint is given by a position coordinate CO-A3 and CO-B3. The mutual relationship between the home register HLR3 and the visitor registers GLR-A3 and GLR-B3 is the same as that earlier disclosed. FIG. 4a also illustrates those parts of a public switched telephone network PSTN3 necessary to the embodiment. An end-subscriber C3 is connected permanently to a standard public exchange E3 in the public telephone network. The geographical location of the standard exchange E3 is given by a position coordinate CO-C3 stored in the standard exchange. Drawing details such as line types for permanent connections and signalling markings have been illustrated in FIG. 4a in the same way as that described with reference to and shown in FIG. 1a.

The signalling necessary to the invention and illustrated in the Figure does not claim to be the total signalling that is effected when connecting a call. Only signalling in the two networks PSTN3 and PLMN3 has been shown in the Figure, while signalling to and from the subscribers involved has been excluded. Neither the text nor the details in the Figure show the signalling that is considered to belong to the state of the art.

The embodiment will be described in more detail below with reference to the call billing procedure adopted when the calling subscriber A3 calls the called subscriber B3 after the called subscriber B3 has asked for calls to be transferred to the end-subscriber C3. As before mentioned, after a call transfer service has been requested in a mobile telephone system, it is essential when billing calls that the geographical locations of the subscribers involved can be determined and that these locations can be brought together for comparison with one another and for calculation of the distance involved. The inventive method now presented is able to perform this important function and includes the following steps:

The calling subscriber A3 calls the called subscriber B3.

The position coordinate CO-A3 of the calling subscriber is taken from the first visitor register GLR-A3 and stored in the first local switch MSC-A3.

A routing query 32 asking for the location of the called subscriber B3, i.e. asking for the identity of the local switch which handles the called subscriber B3, is sent from the first local switch MSC-A3 to the home register HLR3. As before mentioned, the home register cognizant with the visitor register in which the called subscriber is registered at that moment.

With the aid of earlier obtained information, the home register HLR3 establishes that the called subscriber B3 has asked for calls to be transferred to the end-subscriber C3, wherein the inventive method includes the following further steps:

A coordinate query 33 asking for the position coordinate CO-B3 of the called subscriber B3 is sent from the home register HLR3 to the second visitor register GLR-B3 in which the called subscriber B3 is registered.

A coordinate response 34 including the position coordinate CO-B3 of the called subscriber B3 is sent to the home register HLR3 from the second visitor register GLR-B3.

A routing response 37 in answer to the earlier-mentioned routing query 32 and including the call number to the end-subscriber C3 is sent to the first local switch MSC-A3 from the home register HLR3, together with the position coordinate CO-B3 of the called subscriber.

The position coordinate CO-B3 of the called subscriber B3 is stored in the first local switch MSC-A3.

The distance between the position coordinate CO-A3 of the calling subscriber A3 and the position coordinate CO-B3 of the called subscriber B3 is assessed in the first local switch MSC-A3.

A called connection between the calling subscriber A3 and the end-subscriber C3 is prepared. An address message 38 including the call number of the end-subscriber C3 is sent to the standard public exchange E3 from the first local switch MSC-A3, together with the position coordinate CO-B3 of the called subscriber B3.

The position coordinate CO-B3 of the called subscriber B3 is stored in the standard public exchange E3.

The distance between the position coordinate CO-B3 of the called subscriber B3 and the position coordinate C0-C3 of the end-subscriber C3 is assessed in the standard public exchange E3.

The end-subscriber C3 answers the call from the calling subscriber A3 by lifting his telephone receiver, wherewith the call is considered as connected.

The cost of the call between the calling subscriber A3 and the called subscriber B3 is calculated in the first local switch MSC-A3 and the calling subscriber A3 is billed for the cost entailed thereby.

The cost of the call between the called subscriber B3 and the end-subscriber C3 is calculated in the local switch MSC-C3 and the called subscriber B3 is billed for this part of the call.

Figure 4B:
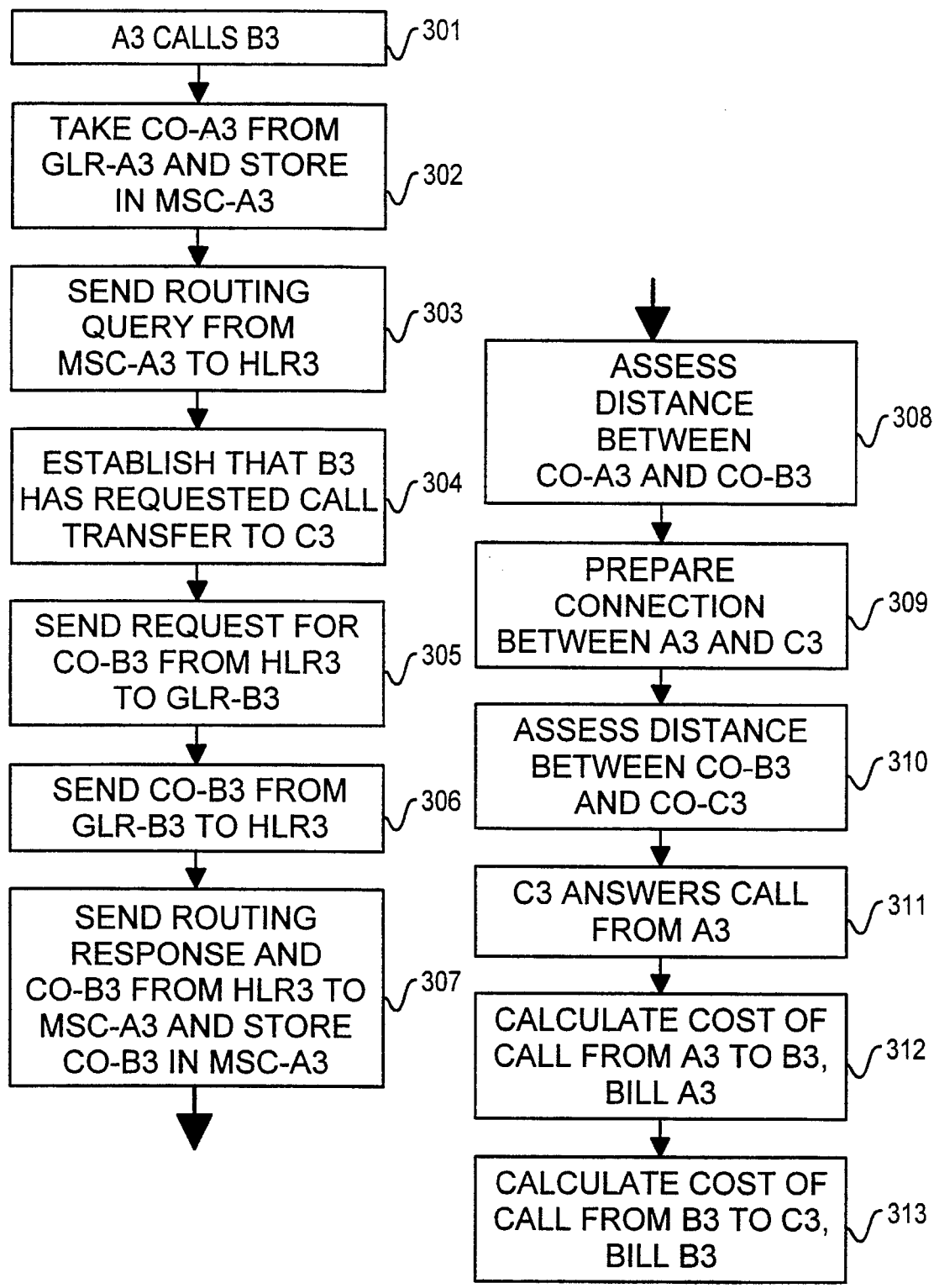

FIG. 4b is a flow sheet which illustrates the above-described method. The flow sheet and the following simplified description of the method are intended to be read together with FIG. 4a and the descriptive text relating to this Figure. The flowsheet illustrates those procedural steps that are most essential to the inventive concept. The abbreviations used in the text have been explained above. The method is carried out in accordance with the following description and in accordance with FIG. 4b:

The calling subscriber A3 calls the called subscriber B3, in accordance with block 301.

The position coordinate CO-A3 of the calling subscriber is taken from the first visitor location register GLR-A3 and stored in the first local switching centre MSC-A3, in accordance with block 302.

A routing query asking for the route to the called subscriber B3 is sent in accordance with known technology from the first local switching centre MSC-A3 to the home location register HLR3, in accordance with block 303.

The home register HLR3 establishes that the called subscriber B3 has asked for calls to be transferred to the end-subscriber C3, in accordance with block 304.

A query containing the request for the position coordinate CO-B3 of the called subscriber B3 is sent from the home register HLR3 to the second visitor location register GLR-B3, in accordance with block 305.

The position coordinate CO-B3 of the called subscriber B3 is sent from the second visitor register GLR-B3 to the home register HLR3, in accordance with block 306.

A routing response containing the call number of the end-subscriber C3 is sent from the home register HLR3 to the first local switch MSC-A3 together with the position coordinate CO-B3 of the called subscriber, in accordance with block 307. The position coordinate CO-B3 of the called subscriber B3 is then stored in the first local switch MSC-A3.

The distance between the position coordinate CO-A3 of the calling subscriber and the position coordinate CO-B3 of the called subscriber is assessed in the first local switch MSC-A3, in accordance with block 308.

A call connection between the calling subscriber A3 and the end-subscriber C3 is prepared, wherein the position coordinate CO-B3 of the called subscriber B3 is sent from the first switch MSC-A3 to the switch MSC-C3. The position coordinate CO-B3 of the called subscriber is stored in the standard public exchange E3, in accordance with block 309.

The distance between the position coordinate CO-B3 of the called subscriber and the position coordinate CO-C3 of the end-subscriber is assessed in the standard public exchange E3, in accordance with block 310.

The end-subscriber C3 answers the call from the calling subscriber A3 by lifting his telephone receiver, in accordance with block 311.

The cost of the call between the calling subscriber A3 and the called subscriber B3 is calculated and the calling subscriber A3 is billed for the cost, in accordance with block 312.

The cost of the call between the called subscriber B3 and the end-subscriber C3 is calculated and the called subscriber B3 is billed for the cost, in accordance with block 313.

The messages coordinate query 33 and coordinate response 34 have the same structure as those messages described above with reference to the earlier embodiments.

Another embodiment of the invention will now be described briefly, in which a calling subscriber A4 and a called subscriber B4 are located within one and the same local exchange included in a PDC-type mobile telephone network.

Figure 5:
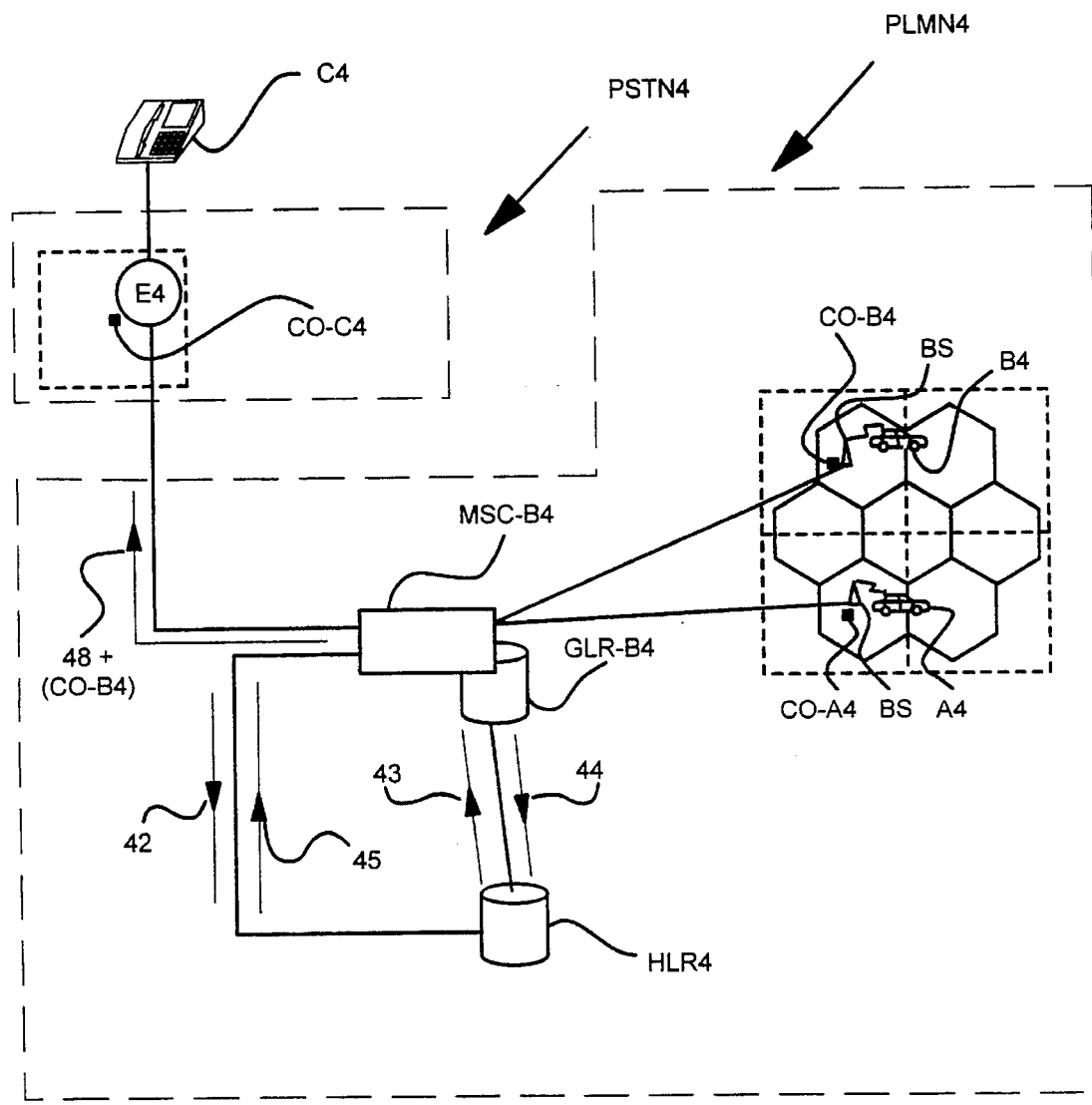
FIG. 5 is a block schematic which illustrates a traffic situation in a telephone network where a mobile calling subscriber calls a mobile subscriber which belongs to the same local switchboard and where the called subscriber has asked for calls to be transferred to a fixed end-subscriber.

Similar to the earlier Figures, FIG. 5 illustrates solely those signalling nodes that are necessary to the invention. The calling subscriber A4 and the called subscriber B4 belong to a mobile telephone network PLMN4. Each of the mobile subscribers is located within its respective cell, these cells being handled by one and the same local switching centre MSC-B4. The subscribers are handled with the same type of equipment as that described with reference to earlier embodiments, namely the local switching centre MSC-B4 and a visitor location register GLR-B4, and a home location register HLR4. The local switch and the visitor register are referred to in this embodiment as a first local switch MSC-B4 and a first visitor register GLR-B4 respectively. As before mentioned, the mobile subscribers are each located within its respective cell, these cells being located within a respective message area, the centre points of which are given by position coordinates CO-A4 and CO-B4 respectively. The mutual relationship between the home register HLR4 and the visitor register GLR-B4 is the same as that earlier mentioned. FIG. 5 also shows those parts of a public switched telephone network PSTN4. An end-subscriber C4 is permanently connected to a standard public exchange E4 in the public telephone network. The geographic position of the public exchange E4 is given by a position coordinate CO-C4 stored in the exchange.

This embodiment of the invention will be described in more detail below and proposes a method of procedure for call billing when the mobile calling subscriber A4 calls the mobile called subscriber B4 after the called subscriber B4 has requested calls to be transferred to the end-subscriber C4. As before mentioned, in the case of call billing after a call transfer service has been requested in a mobile telephone system it is essential to be able to localize the geographic positions of the subscribers involved and to bring these positions together for comparison with one another and for distance calculating purposes. The inventive method now presented is able to perform this important function and comprises the following steps:

The calling subscriber A4 calls the called subscriber B4.

The position coordinate CO-A4 of the calling subscriber is taken from the first visitor register GLR-B4 and stored in the first local switch MSC-B4.

A routing query 42 asking to be informed of the location of the called subscriber B4, i.e. a query asking to be informed of the local switch that handles the called subscriber B4, is sent from the first local switch MSC-B4 to the home register HLR4. As before mentioned, the home register is cognizant with the visitor register in which the called subscriber is registered at that moment in time.

With the aid of earlier obtained information, the home register HLR4 establishes that the called subscriber B4 has asked for calls to be transferred to the end-subscriber C4, wherein the inventive method includes the following further steps:

A coordinate query 43 asking for the position coordinate CO-B4 of the called subscriber B4 is sent from the home register HLR4 to the first visitor register GLR-B4 in which the called subscriber B4 is registered at that moment in time.

A coordinate response 44 containing the position coordinate CO-B4 of the called subscriber B4 is sent from the first visitor register GLR-B4 to the home register HLR4.

A routing response 45 in answer to the aforesaid routing query 42 and containing routing information relating to the end-subscriber C4 is sent from the home register HLR4 to the first local switch MSC-B4, together with the position coordinate CO-B4 of the called subscriber.

The position coordinate CO-B4 of the called subscriber B4 is stored in the first local switch MSC-B4.

A call connection between the calling subscriber A4 and the end-subscriber C4 is prepared. An address message 48 containing the call number of the end-subscriber C4 is sent from the first local switch MSC-B4 to the standard exchange E4, together with the position coordinate CO-B4 of the called subscriber B4.

The position coordinate CO-B4 of the called subscriber B4 is stored in the standard public exchange E4.

The distance between the position coordinate CO-A4 of the calling subscriber A4 and the position coordinate CO-B4 of the called subscriber B4 is assessed in the first local switch MSC-B4.

The distance between the position coordinate CO-B4 of the called subscriber B4 and the position coordinate CO-C4 of the end-subscriber C4 is assessed in the public exchange E4.

The end-subscriber C4 answers the call from the calling subscriber A4 by lifting his telephone receiver, whereupon the call is considered to have been connected.

The cost of the call between the calling subscriber A4 and the called subscriber B4 is calculated in the first local switch MSC-B4 and the calling subscriber A4 is billed for the cost.

The cost of the call between the called subscriber B4 and the end-subscriber C4 is calculated in the public exchange E4 and the called subscriber B4 is billed for the cost.

The aforementioned messages coordinate query 43 and coordinate response 44 have the same structure as those referred to in connection with the earlier embodiments and illustrated with the aid of FIG. 1c.

As inferred in the aforegoing, the illustrated and described exemplifying embodiments of the invention may be varied without departing from the scope of the invention. For the sake of simplicity, it has been assumed in all embodiments that the local switching centres and the visitor location registers associated therewith have the form of one physical unit. It is conceivable, however, for the switching centre and the register to be two different units that are connected one with the other. This dissimilarity in configuration has no significance to the invention. Furthermore, the order in which the various method steps are carried out may vary, provided that the desired end result is obtained. The shape and size of the message areas may also vary. For instance, it is conceivable to represent each cell by one message area. The position coordinates illustrated and described in the descriptions of the embodiments may be replaced with numbers that are specific to the message areas and by means of which the geographical position of the message areas can be established. As explained in connection with the first embodiment described above, the message structure will only be seen as an example of one such structure. Furthermore, it is feasible with all of these embodiments for the called subscriber to be located temporarily with an operator other than his normal operator at the time the call is made, as illustrated in the first embodiment. In this case, the two messages "coordinate query" and "coordinate response" are sent between two operators. The aforedescribed exemplifying embodiments of the invention therefore merely represent examples of different traffic situations embraced by the invention. FIGS. 6a–d illustrate with the aid of symbols other examples of traffic situations. The symbols are explained briefly below, followed by a brief analysis of each of the FIGS. 6a–d.

Symbol explanation:

A rectangle 501 corresponds to a mobile telephone network.

An octagon 502 corresponds to a public switched telephone network.

A triangle 503 corresponds to a main switching centre, the function of which has been earlier explained in connection with the above embodiments.

A circle 504 corresponds to a local switching centre, this circle enclosing the subscribers that are handled by the local switching centre at that time.

A first letter A corresponds to a calling subscriber, who may be a mobile unit or a telephone unit permanently connected to a public switched telephone network. The type of subscriber can be discerned with the aid of the symbols 501, 502, which designate the type of telephone network concerned.

A second letter B corresponds to a called subscriber, which in this case is a mobile unit.

A third letter C corresponds to an end-subscriber, which may be a mobile unit or a telephone unit permanently connected to a public switched telephone network. The type of subscriber involved can be discerned with the aid of the symbols 501, 502, which indicate the type of telephone network concerned.

Figure 6A:
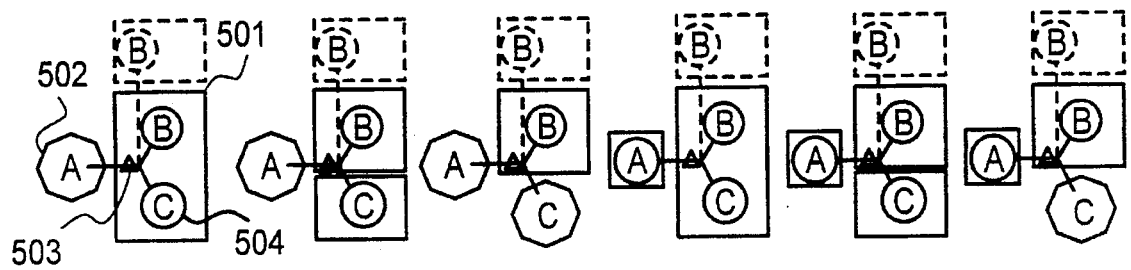
FIGS. 6a–d illustrate a number of traffic situations in which the invention can be applied.
Figure 6B:
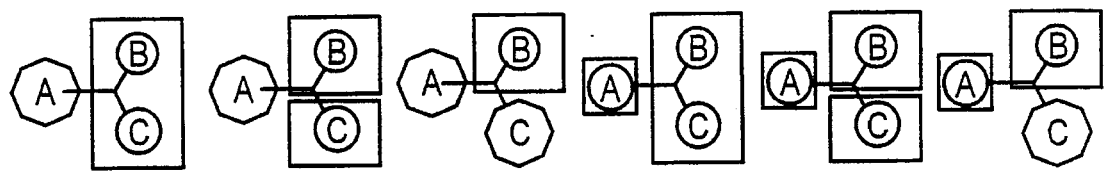
Figure 6C:
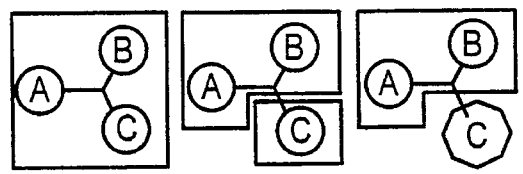
Figure 6D:
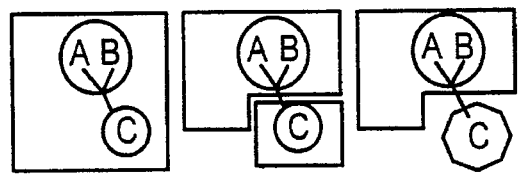

It should be mentioned that in all of the traffic situations shown in FIGS. 6a, 6c and 6d, the called subscriber B may at that time be a visitor in another mobile telephone network handled by another operator. This has been indicated in FIG. 6a with broken lines.

FIG. 6a illustrates six different traffic situations with the aid of six part-Figures. A basic feature of the six traffic situations is that the called subscriber B and the calling subscriber A are permanently registered in different telephone networks 501, 502 and that a connection between the telephone networks is effected via a main switch 503. The first of the six part-Figures represents the second embodiment described above. As before mentioned, those instances in which the called subscriber is located in a mobile telephone network other than its local network have been indicated with broken lines. The third of these traffic situations is represented by the first embodiment described above.

FIG. 6b illustrates a further six traffic situations with the aid of six part-Figures. A basic feature of these six traffic situations is that the called subscriber B and the calling subscriber A are permanently registered in different telephone networks 501, 502 and that a connection between the telephone networks is effected via the local switching centre that handles the called subscriber B. The first of these six part-Figures is represented by the third embodiment described above.

FIG. 6c illustrates examples of traffic situations with the aid of three part-Figures. A basic feature of these three traffic situations is that the calling subscriber A and the called subscriber B are located in one and the same mobile telephone network 501 but are handled by different local switching centres 504. The third of the three part-Figures is represented by the fourth embodiment described above.

FIG. 6d illustrates examples of a further three traffic situations, with the aid of three part-Figures. A basic feature of the six traffic situations is that the calling subscriber A and the called subscriber B are located in one and the same mobile telephone network 501 and are handled by the same local switching centres 504. The third of the three part-Figures is represented by the fifth embodiment described above.

Thus, the invention also relates to a telephone system which also includes mobile telephone systems and in which a mobile subscriber may request a call transfer service to an end-subscriber. The invention provides the advantage of enabling the costs of a call between a calling and a called subscriber to be shared fairly, in a ready fashion. The invention also enables the system to decide readily whether or not a call shall be connected in those cases when a subscriber has requested restrictions with regard to the connection of long distance calls.

As will be understood, the invention is not restricted to the aforedescribed and illustrated exemplifying embodiments thereof and that modifications can be made within the scope of the following Claims.

We claim:

1. A method for transferring a position mark of a mobile subscriber in a telecommunications system which includes a first mobile telephone network, wherein the network includes a main switching centre to which a home location register is connected and wherein the mobile subscriber is permanently registered in the home location register, wherein the telecommunications system also includes a second mobile telephone network which includes at least one first switching centre including a visitor location register in which the mobile subscriber, which is temporarily handled by the first switching centre, is registered together with information relating to the position mark of the mobile subscriber, wherein the second mobile telephone network also includes a main visitor location register which is cognizant of the visitor location register in the second mobile telephone network in which the visiting mobile subscriber is registered at that moment in time, there being a request from the mobile subscriber for the transfer of calls to an end-subscriber, and a call to the mobile subscriber from a calling subscriber which is connected to a second switching centre in a telephone network which is connected to the first mobile telephone network, the method comprising the steps of:

sending from the second switching centre to the main switching centre a position mark which marks the geographic position of the calling subscriber;

storing the position mark of the calling subscriber in the main switching centre, whereafter the inventive method includes the following steps:

taking the position mark of the called mobile subscriber from the visitor location register to the home location register, via the main visitor location register;

forwarding the position mark of the called mobile subscriber from the home location register to the main switching centre; and storing the position mark of the called mobile subscriber in the main switching centre.

2. A method according to claim 1, wherein transferring the position mark of the called mobile subscriber from the visitor location register to the home location register comprises the steps of sending a coordinate query with address to the main visitor location register from the home location register, said query including a request for information regarding the position coordinate of the called mobile subscriber;

sending a coordinate query with address to the visitor location register from the main visitor location register, and including in the query a request for knowledge of the position coordinate of the called mobile subscriber;

sending a coordinate response with address from the visitor location register to the main visitor location register, and including the requested position coordinate in the response; and sending a coordinate response with address from the main visitor location register to the home location register and including in the response the requested position coordinate.

3. A method for transferring a position mark of a mobile subscriber in a telecommunications system which includes a mobile telephone network, a first telephone network in the telecommunications system, wherein the subscriber is permanently registered in a home location register in the mobile telephone network, wherein the mobile telephone network includes at least one main switching centre to which at least one first switching centre is connected, wherein the first switching centre includes a visitor location register in which the mobile subscriber, which is temporarily handled by the first switching centre, is registered together with information relating to the position mark, there being a request from the mobile subscriber for a call transfer to an end-subscriber, and a call from a calling subscriber which is connected to a second switching centre in a second telephone network in the telecommunications system to the mobile subscriber, the method comprising the steps of:

sending from the second switching centre to the main switching centre a position mark which marks the geographic position of the calling subscriber;

storing the position mark in the main switching centre, whereafter the inventive method comprises the steps of transferring the position mark of the called mobile subscriber from the visitor location register to the home location register;

forwarding the position mark of the called mobile subscriber from the home location register to the main switching centre; and storing the position mark of the called subscriber in the main switching centre.

4. A method according to claim 3, wherein transferring the position mark of the called mobile subscriber from the visitor location register to the home location register comprises the steps of sending from the home location register to the visitor location register a coordinate query which includes a request for the position coordinate of the called mobile subscriber; and sending from the visitor location register to the home location register a coordinate response which includes the requested position coordinate.

5. A method according to claim 1, further comprising the steps of:

preparing a call for connection between the calling subscriber and the end-subscriber, wherein the position mark of the called mobile subscriber is sent from the main switching centre to a third switching centre which handles the end-subscriber; and storing the position mark of the called mobile subscriber in the third switching centre.

6. A method according to claim 5, wherein the end-subscriber is a mobile subscriber whose position coordinate is transferred from a visitor location register in which the end-subscriber is registered, to the third switching centre.

7. A method according to claim 5, wherein the calling subscriber has specified a condition for the distance between itself and the called mobile subscriber at which a call may be connected, and the method further comprises the steps of:

assessing the distance between the calling subscriber and the called mobile subscriber with the aid of the position coordinates of the subscribers; and deciding whether or not the call shall be connected, this decision being based on a comparison of the aforesaid distance with the distance conditions earlier specified by the calling subscriber.

8. A method according to claim 7, in which a preliminary decision to connect the call is made, wherein the called mobile subscriber has specified a distance condition concerning the distance between itself and the end-subscriber for which a call may be connected, further comprising the steps of:

assessing said distance between the called mobile subscriber and the end-subscriber with the aid of the position coordinate of the subscribers; and deciding whether or not to connect the call, this decision being based on a comparison of the aforesaid distance with the distance condition earlier specified by the called subscriber.

9. A method according to claim 8, in which it is finally decided to connect the call, whereafter the end-subscriber answers the call, further comprising the steps of:

calculating a primary call cost on the basis of a billing tariff specific to the distance between the calling subscriber and the called mobile subscriber, and billing the calling subscriber for the primary call cost; and calculating a secondary call cost on the basis of a billing tariff specific to the distance between the called mobile subscriber and the end-subscriber and billing the called subscriber for the secondary call cost.

10. A method according to claim 5, wherein the end-subscriber answers the call from the calling subscriber, further comprising the steps of:

assessing the distance between the calling subscriber and the called mobile subscriber with the aid of the position coordinates of the subscribers;

calculating a primary call cost on the basis of a billing tariff specific to the distance between the calling subscriber and the called mobile subscriber and then billing the calling subscriber for the primary call cost;

assessing the distance between the called mobile subscriber and the end-subscriber with the aid of the position coordinates of the subscribers; and calculating a secondary call cost on the basis of a billing tariff which is specific to the distance between the called subscriber and the end-subscriber and then billing the called mobile subscriber for the secondary call cost.

11. A method according to claim 10, wherein the primary call cost is calculated in the main switching centre.

12. A method according to claim 10, wherein the secondary call cost is calculated in the third switching centre.

13. A method according to claim 2, wherein the coordinate query includes a predetermined number of binary characters which define this type of message.

14. A method according to claim 2, wherein the coordinate response includes a predetermined number of binary characters which define this type of message.

15. A method for transferring a position mark of a mobile called subscriber in a telecommunications system which includes a mobile telephone network, a first telephone network in the telecommunications system, wherein the subscriber is permanently registered in a home location register in the mobile telephone network, wherein the mobile telephone network includes at least one first switching centre which includes a visitor location register in which the mobile subscriber, which is temporarily handled by the switching centre, is registered together with information relating to the position mark, there being a request from the mobile subscriber for calls to be transferred to an end-subscriber, and a call to the mobile subscriber from a calling subscriber which is connected to a second switching centre in a second telephone network, the method comprising the steps of:

sending from the second switching centre to the first switching centre a position mark which marks the geographic position of the calling subscriber;

storing the position mark in the first switching centre, whereafter the inventive method comprises the steps of:

transferring the position mark of the called mobile subscriber from the visitor location register to the home location register;

forwarding the position mark of the called mobile subscriber from the home location register to the first switching centre; and storing the position mark of the called subscriber in the first switching centre.

16. A method according to claim 15, wherein transferring the position mark of the called mobile subscriber from the visitor location register to the home location register comprises the steps of sending from the home location register to the visitor location register a coordinate query which includes a request for knowledge of the position coordinate of the called mobile subscriber; and sending from the visitor location register to the home location register a coordinate response which includes the requested position coordinate.

17. A method according to claim 15, further comprising the steps of preparing a call connection between the calling subscriber and the end-subscriber, wherein the position mark of the called mobile subscriber is sent from the first switching centre to a third switching centre which handles the end-subscriber; and storing the position mark of the called mobile subscriber in the third switching centre.

18. A method according to claim 17, wherein the end-subscriber is a mobile subscriber whose position coordinate is transferred from a visitor location register in which the end-subscriber is registered to the third switching centre.

19. A method according to claim 17, wherein the calling subscriber has specified a condition with regard to the distance between itself and the called mobile subscriber for which a call may be connected, and further comprising the steps of:

assessing the aforesaid distance between the calling subscriber and the called mobile subscriber with the aid of the position coordinates of the subscribers; and deciding whether or not the call shall be connected on the basis of a comparison made between the aforesaid distance and the distance condition earlier specified by the calling subscriber.

20. A method according to claim 19, in which a preliminary decision has been made to connect the call, wherein the called mobile subscriber has specified a condition with regard to the distance between itself and the end-subscriber under which a call may be connected, and further comprising the steps of:

assessing the distance between the called mobile subscriber and the end-subscriber with the aid of the position coordinates of the subscriber; and deciding whether or not the call shall be connected, on the basis of a comparison between the aforesaid distance and the distance condition earlier specified by the called subscriber.

21. A method according to claim 20, in which a final decision to connect the call has been made and in which the end-subscriber has answered the call, and further comprising the steps of:

calculating a primary call cost on the basis of a billing tariff which is specific to the distance between the calling subscriber and the called mobile subscriber, and billing the calling subscriber for the primary call cost; and calculating a secondary call cost on the basis of a billing tariff specific to the distance between the called mobile subscriber and the end-subscriber, and billing the called subscriber for the secondary call cost.

22. A method according to claim 17, in which the end-subscriber has answered the call from the calling subscriber, and further comprising the steps of:

assessing the distance between the calling subscriber and the called mobile subscriber with the aid of the position coordinates of the subscribers;

calculating the primary call cost on the basis of a billing tariff specific to the distance between the calling subscriber and the called mobile subscriber and billing the calling subscriber for the primary call cost;

assessing the distance between the called mobile subscriber and the end-subscriber with the aid of the position coordinates of the subscribers; and calculating a secondary call cost on the basis of a billing tariff specific to the distance between the called subscriber and the end-subscriber and then billing the called mobile subscriber for the secondary call cost.

23. A method according to claim 22, wherein the primary call cost is calculated in the first switching centre.

24. A method according to claim 22, wherein the secondary call cost is calculated in the third switching centre.

25. A method according to claim 16, wherein a predetermined number of binary characters are included in the coordinate query which define this type of message.

26. A method according to claim 16, wherein a predetermined number of binary characters are included in the coordinate response which define this type of message.

27. A method for transferring a position mark of a first mobile subscriber in a telecommunications system which includes a first mobile telephone network in which the first mobile subscriber and a second mobile subscriber are permanently registered in a home location register in the mobile telephone network, wherein the mobile telephone network includes a second switching centre which handles the second mobile subscriber, wherein the second switching centre includes a visitor location register in which the second subscriber, which is handled by the switching centre at that moment in time, is registered together with information concerning the position mark of the second subscriber, wherein the telecommunications system also includes a second mobile telephone network which includes at least one first switching centre, wherein the first switching centre includes a visitor location register in which the first mobile subscriber, which at that moment in time is handled by the first switching centre, is registered together with information relating to the position mark of the mobile subscriber, wherein the second mobile telephone network also includes a main visitor location register which is cognizant of the visitor register in the second mobile telephone network in which the visiting mobile subscriber is registered at that moment in time, there being a request from the first mobile subscriber for a call transfer service to an end-subscriber, and a call from the second calling mobile subscriber to the first called mobile subscriber, and a transfer of the position mark of the calling mobile subscriber from the visitor location register in which the subscriber is registered to the second local switching centre and storing the position mark in said region, whereafter the method comprises the steps of:

transferring the position mark of the called mobile subscriber from the visitor location register in which the called subscriber is registered, to the home register;

forwarding the position mark of the called mobile subscriber from the home location register to the second switching centre; and storing the position mark of the called mobile subscriber in the second switching centre.

28. A method according to claim 27, wherein the transfer of the position mark of the called mobile subscriber from the visitor location register in which the called subscriber is registered to the home location register comprises the steps of:

sending a coordinate query with address from the home location register to the main visitor location register, said query including a request for information regarding the position coordinate of the called mobile subscriber;

sending a coordinate query with address from the main visitor location register to the visitor location register in which the called mobile subscriber is registered, said query including a request for information concerning the position coordinate of the called mobile subscriber;

sending a coordinate response with address from the visitor location register in which the called mobile subscriber is registered to the main visitor location register, this response including the requested position coordinate; and sending a coordinate response with address from the main visitor location register to the home location register, this response including the requested position coordinate.

29. A method for transferring a position mark of a first mobile subscriber in a telecommunications system which comprises a mobile telephone network in which the first mobile subscriber and a second mobile subscriber are permanently registered in a home location register in the mobile telephone network, wherein the mobile telephone network includes at least one first switching centre which handles the first mobile subscriber, and a second switching centre which handles the second mobile subscriber, wherein each of the switching centres includes a visitor location register in which the subscribers are registered temporarily together with information relating to the position mark of respective subscribers, there being a request from the first mobile subscriber for a call transfer service to an end-subscriber, and a call from the calling, second mobile subscriber to the first, called mobile subscriber, the method comprising the steps of:

transferring the position mark of the calling mobile subscriber from the visitor location register in which the subscriber is registered to the second local switching centre;

storing the position mark in said local switching centre, whereafter the inventive method comprises the steps of transferring the position mark of the called mobile subscriber from the visitor location register in which the called subscriber is registered to the home location register;

forwarding the position mark of the called mobile subscriber from the home location register to the second switching centre; and storing the position mark of the called mobile subscriber in the second switching centre.

30. A method according to claim 29, wherein transferring the position mark of the called mobile subscriber from the visitor location register in which the called subscriber is registered to the home location register comprises the steps of sending a coordinate query containing a request for the position coordinate of the called mobile subscriber from the home location register to the visitor location register in which the called subscriber is registered; and sending a coordinate response which includes the requested position coordinate from the visitor location register in which the called subscriber is registered to the home location register.

31. A method according to claim 29, further comprising the steps of:

preparing a connection of the call between the calling subscriber and the end-subscriber, wherein the position mark of the called mobile subscriber is sent from the second switching centre to a third switching centre which handles the end-subscriber; and storing the position mark of the called mobile subscriber in the third switching centre.

32. A method according to claim 31, wherein the end-subscriber is a mobile subscriber whose position coordinate is collected from a visitor location register in which the subscriber is registered and transferred to the third switching centre.

33. A method according to claim 31, in which the calling subscriber has specified a condition with regard to the distance between itself and the called mobile subscriber for which the call can be connected, and further comprising the steps of:

assessing the distance between the calling subscriber and the called mobile subscriber with the aid of the position coordinates of the respective subscribers; and deciding whether or not the call shall be connected, this decision being based on a comparison between the aforesaid distance and the distance condition earlier specified by the called subscriber.

34. A method according to claim 33, in which a preliminary decision has been made to connect the call, the called mobile subscriber has specified a condition with regard to the distance between itself and the end-subscriber for which a call may be connected, and further comprising the steps of:

assessing the distance between the called mobile subscriber and the end-subscriber with the aid of the position coordinates of the subscribers; and deciding whether or not the call shall be connected, this decision being based on a comparison between the aforesaid distance and the distance condition earlier specified by the called subscriber.

35. A method according to claim 34, in which a final decision is made to connect the call, and in which the end-subscriber has answered the call, and further comprising the steps of:

calculating a primary call cost on the basis of a billing tariff specific to the distance between the calling subscriber and the called mobile subscriber, and billing the calling subscriber for the primary call cost; and calculating a secondary call cost on the basis of a billing tariff specific to the distance between the called mobile subscriber and the end-subscriber, and billing the called subscriber for the secondary call cost.

36. A method according to claim 31, in which the end-subscriber has answered the call from the calling subscriber, and further comprising the steps of:

assessing the distance between the calling subscriber and the called mobile subscriber with the aid of the position coordinates of respective subscribers;

calculating a primary call cost on the basis of a billing tariff specific to the distance between the calling subscriber and the called mobile subscriber, and billing the calling subscriber for the primary call cost;

assessing the distance between the called mobile subscriber and the end-subscriber with the aid of the position coordinates of respective subscribers; and calculating a secondary call cost on the basis of a billing tariff specific to the distance between the called subscriber and the end-subscriber, and billing the called mobile subscriber for the secondary call cost.

37. A method according to claim 36, wherein the primary call cost is calculated in the second switching centre.

38. A method according to claim 36, wherein the secondary call cost is calculated in the switching centre which handles the end-subscriber.

39. A method according to claim 30, wherein a predetermined number of binary characters are included in the coordinate query which define this type of message.

40. A method according to claim 30, wherein the coordinate response includes a predetermined number of binary characters which define this type of message.

41. A method for transferring a position mark of a first mobile subscriber in a telecommunications system which includes a mobile telephone network, a first telephone network in the telecommunications system where the first mobile subscriber and a second mobile subscriber are permanently registered in a home location register in the mobile telephone network, wherein the mobile telephone network includes at least one second switching centre which handles the first mobile subscriber and the second mobile subscriber, wherein the switching centre includes a visitor location register in which the subscribers which are handled temporarily by the switching centre are registered together with information relating to the position marks of respective subscribers, there being a request from the first mobile subscriber for a call transfer service to an end-subscriber, and a call from the second calling mobile subscriber to the first, called mobile subscriber, the method comprising the steps of:

connecting the position mark of the calling mobile subscriber from the visitor location register and transferring the position mark to the second switching centre and storing the position mark in said second switching centre, whereafter the inventive method comprises the steps of collecting the position mark of the called mobile subscriber from the visitor location register in which the called subscriber is registered and transferring said position mark to the home location register;

forwarding the position mark of the called mobile subscriber from the home location register to the second switching centre; and storing the position mark of the called mobile subscriber in the second switching centre.

42. A method according to claim 41, wherein collecting the position mark of the called mobile subscriber from the visitor location register to the home location register includes the steps of sending a coordinate query containing a request for information relating to the position coordinate of the called mobile subscriber from the home location register to the visitor location register; and sending a coordinate response which includes the requested position coordinate from the visitor location register to the home location register.

43. A method according to claim 41, further comprising the steps of:

preparing a call connection between the calling subscriber and the end-subscriber, wherein the position mark of the called mobile subscriber is sent from the second switching centre to a third switching centre which handles the end-subscriber; and storing the position mark of the called mobile subscriber in the third switching centre.

44. A method according to claim 43, wherein the end-subscriber is a mobile subscriber whose position coordinate is collected from a visitor location register in which the subscriber is registered and transferred to the third switching centre.

45. A method according to claim 43, in which the calling subscriber has specified a condition concerning the distance between itself and the called mobile subscriber for which the call may be connected, and further comprising the steps of:

assessing the distance between the calling subscriber and the called mobile subscriber with the aid of the position coordinates of respective subscribers; and deciding whether or not the call shall be connected, this decision being based on a comparison between the aforesaid distance and the distance condition earlier specified by the calling subscriber.

46. A method according to claim 45, in which a preliminary decision to connect the call has been made, the called mobile subscriber has specified a condition with regard to the distance between itself and the end-subscriber for which a call can be connected, and further comprising the steps of:

assessing the distance between the called mobile subscriber and the end-subscriber with the aid of the position coordinates of respective subscribers; and deciding whether or not the call shall be connected, this decision being based on a comparison between the aforesaid distance and the distance condition earlier specified by the called subscriber.

47. A method according to claim 46, in which a final decision to connect the call has been made, the end-subscriber has answered the call, and further comprising the steps of:

calculating a primary call cost on the basis of a billing tariff specific to the distance between the calling subscriber and the called mobile subscriber, and billing the calling subscriber for the primary call cost; and calculating a second call cost on the basis of a billing tariff specific to the distance between the called mobile subscriber and the end-subscriber, and billing the called subscriber for the secondary call cost.

48. A method according to claim 43, in which the end-subscriber has answered the call from the calling subscriber, and further comprising the steps of:

assessing the distance between the calling subscriber and the called mobile subscriber with the aid of the position coordinates of respective subscribers;

calculating a primary call cost on the basis of a billing tariff specific to the distance between the calling subscriber and the called mobile subscriber and billing the calling subscriber for the primary call cost;

assessing the distance between the called mobile subscriber and the end-subscriber with the aid of the position coordinate of respective subscriber; and calculating a secondary call cost on the basis of a billing tariff specific to the distance between the called subscriber and the end-subscriber, and billing the called mobile subscriber for the secondary call cost.

49. A method according to claim 48, wherein the primary call cost is calculated in the second switching centre.

50. A method according to claim 48, wherein the secondary call cost is calculated in the switching centre that handles the end-subscriber.

51. A method according to claim 42, wherein the coordinate query includes a predetermined number of binary characters which define this type of message.

52. A method according to claim 42, wherein the coordinate response includes a predetermined number of binary characters which define this type of message.

53. A method according to claim 7, in which it has been decided to release the call, and the calling subscriber is informed that the condition has not been fulfilled through a spoken message.

54. A method according to claim 8, in which a decision has been made to release the call, and the calling subscriber is informed that the condition has not been fulfilled through a spoken message.

55. A method according to claim 1, wherein the main visitor location register obtains continuously from the visitor location register information concerning the position mark of the called mobile subscriber, and transferring of this information to the home location register comprises the steps of:

sending from the home location register to the main visitor location register a coordinate query with address, this query containing a request for the position coordinate of the called mobile subscriber; and sending a coordinate response with address from the main visitor location register to the home location register, this response containing the requested position coordinate.

56. A method according to claim 27, wherein the main visitor location register obtains continuously from the visitor location register information relating to the position mark of the called mobile subscriber, and collecting the position mark and transferring the position mark to the home location register comprises the steps of:

sending a coordinate query with address to the main visitor location register from the home location register, this query containing a request for the position coordinates of the called mobile subscriber;

sending a coordinate query with address from the main visitor location register to the visitor location register in which the called mobile subscriber is registered, this query containing a request for the position coordinates of the called mobile subscriber;

sending a coordinate response with address to the main visitor location register from the visitor location register in which the called mobile subscriber is registered, this response containing the requested position coordinates; and sending a coordinate response with address from the main visitor location register to the home location register, this response containing the requested position coordinates.

* * * * *